US011138582B2

(12) United States Patent
Dunjic et al.

(10) Patent No.: US 11,138,582 B2
(45) Date of Patent: Oct. 5, 2021

(54) REAL-TIME EXECUTION OF DATA EXCHANGES BETWEEN COMPUTING SYSTEMS BASED ON SELECTIVELY ALLOCATED PARAMETERS

(71) Applicant: The Toronto-Dominion Bank, Toronto (CA)

(72) Inventors: Milos Dunjic, Oakville (CA); Perry Aaron Jones Haldenby, Toronto (CA); John Jong-Suk Lee, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 330 days.

(21) Appl. No.: 15/622,269

(22) Filed: Jun. 14, 2017

(65) Prior Publication Data

US 2018/0365670 A1  Dec. 20, 2018

(51) Int. Cl.
*G06Q 20/20* (2012.01)
*G06Q 20/32* (2012.01)

(52) U.S. Cl.
CPC ......... *G06Q 20/204* (2013.01); *G06Q 20/206* (2013.01); *G06Q 20/3223* (2013.01)

(58) Field of Classification Search
CPC . G06Q 20/204; G06Q 20/206; G06Q 20/3223
See application file for complete search history.

(56) References Cited

U.S. PATENT DOCUMENTS

| 5,764,742 | A  | * | 6/1998  | Howard   | G06Q 20/3272 379/114.15 |
| 7,543,739 | B2 | * | 6/2009  | Brown    | G06K 19/06187 235/375 |
| 7,630,924 | B1 | * | 12/2009 | Collins  | G06Q 10/025 705/35 |
| 8,341,088 | B2 | * | 12/2012 | Boutahar | G06Q 20/00 705/76 |

(Continued)

OTHER PUBLICATIONS

Mowat et al., "Mobile financial services; the evolution of payment," Analysis Mason Limited, Oct. 2013 (18 pages).

(Continued)

*Primary Examiner* — Peter Ludwig
*Assistant Examiner* — Michael Jared Walker
(74) *Attorney, Agent, or Firm* — Duane Morris LLP

(57) ABSTRACT

The disclosed embodiments include computer-implemented systems and processes that perform operations that initiate, approve, and execute exchanges of data between network-connected systems, apparatuses, and devices in a computing environment. For example, a network-connected apparatus may receive a first value of a parameter that characterizes an exchange of data initiated at a terminal device, identify a second value of the parameter allocated to the client device. In response to a determination that the first parameter value exceeds the second parameter value, the apparatus may request, and receive, parameter data from an application program executed by the at least one processor. The parameter data may identify a third value of the parameter allo- (Continued)

cated to the client device by the executed application program, and the apparatus may authorize, based on the second and third parameter values, a performance of the initiated data exchange in accordance with the first parameter value.

20 Claims, 8 Drawing Sheets

(56) References Cited

U.S. PATENT DOCUMENTS

| | | | | |
|---|---|---|---|---|
| 8,478,734 | B2* | 7/2013 | Niejadlik | H04M 3/38 |
| | | | | 707/709 |
| 8,538,845 | B2* | 9/2013 | Liberty | G06Q 20/0855 |
| | | | | 705/35 |
| 8,646,685 | B2* | 2/2014 | Bishop | G06Q 20/02 |
| | | | | 235/379 |
| 8,814,039 | B2* | 8/2014 | Bishop | G06Q 20/403 |
| | | | | 235/379 |
| 8,820,633 | B2* | 9/2014 | Bishop | G06Q 20/02 |
| | | | | 235/379 |
| 8,833,644 | B2* | 9/2014 | Randazza | G06Q 20/40 |
| | | | | 235/379 |
| 8,875,990 | B2* | 11/2014 | Bishop | G06Q 20/02 |
| | | | | 235/379 |
| 9,235,831 | B2* | 1/2016 | Rolf | G06Q 20/02 |
| 9,235,832 | B1* | 1/2016 | Billman | G06Q 20/388 |
| 2005/0240527 | A1* | 10/2005 | Goldman | G07F 7/1025 |
| | | | | 705/44 |
| 2006/0163369 | A1 | 7/2006 | Dischamp | G06K 19/073 |
| | | | | 235/492 |
| 2007/0005403 | A1* | 1/2007 | Kennedy | G16H 10/60 |
| | | | | 705/4 |
| 2008/0010189 | A1* | 1/2008 | Rosenberger | G06Q 20/10 |
| | | | | 705/39 |
| 2009/0157518 | A1* | 6/2009 | Bishop | G06Q 20/40 |
| | | | | 705/19 |
| 2009/0157519 | A1* | 6/2009 | Bishop | G06Q 20/02 |
| | | | | 705/19 |
| 2009/0164324 | A1* | 6/2009 | Bishop | G06Q 20/204 |
| | | | | 705/17 |
| 2009/0164329 | A1* | 6/2009 | Bishop | G06Q 20/202 |
| | | | | 705/19 |
| 2009/0164373 | A1* | 6/2009 | Blythe | G06Q 20/40 |
| | | | | 705/44 |
| 2009/0216638 | A1* | 8/2009 | Matthews | G06Q 30/0207 |
| | | | | 705/14.17 |
| 2009/0287564 | A1* | 11/2009 | Bishop | G06Q 40/00 |
| | | | | 705/14.38 |
| 2009/0287565 | A1* | 11/2009 | Bishop | G06Q 20/403 |
| | | | | 705/14.38 |
| 2010/0312636 | A1* | 12/2010 | Coulter | G06Q 20/10 |
| | | | | 705/14.38 |
| 2012/0166334 | A1* | 6/2012 | Kimberg | G06Q 20/401 |
| | | | | 705/44 |
| 2012/0278233 | A1* | 11/2012 | Webber | G06Q 40/02 |
| | | | | 705/42 |
| 2013/0013507 | A1* | 1/2013 | Browning | G06Q 20/405 |
| | | | | 705/44 |
| 2013/0080228 | A1* | 3/2013 | Fisher | G06Q 20/3255 |
| | | | | 705/14.23 |
| 2013/0275300 | A1* | 10/2013 | Killian | G06Q 20/349 |
| | | | | 705/41 |
| 2014/0052553 | A1* | 2/2014 | Uzo | G06Q 20/322 |
| | | | | 705/18 |
| 2014/0108263 | A1* | 4/2014 | Ortiz | G06Q 20/322 |
| | | | | 705/71 |
| 2014/0279486 | A1* | 9/2014 | Kessler | G06Q 20/4016 |
| | | | | 705/42 |
| 2014/0279552 | A1* | 9/2014 | Ortiz | G06Q 20/3278 |
| | | | | 705/65 |
| 2015/0100442 | A1* | 4/2015 | Van Heerden | G06Q 20/327 |
| | | | | 705/16 |
| 2015/0100443 | A1* | 4/2015 | Van Heerden | G06Q 40/025 |
| | | | | 705/16 |
| 2015/0193873 | A1* | 7/2015 | Hammock | G06Q 20/4016 |
| | | | | 705/38 |
| 2015/0199679 | A1* | 7/2015 | Palanisamy | G06Q 20/34 |
| | | | | 705/67 |
| 2015/0262181 | A1* | 9/2015 | Gervais | G06Q 20/10 |
| | | | | 705/44 |
| 2015/0262183 | A1* | 9/2015 | Gervais | G06Q 20/10 |
| | | | | 705/44 |
| 2016/0012428 | A1* | 1/2016 | Haldenby | G06Q 20/354 |
| | | | | 705/39 |
| 2016/0125395 | A1* | 5/2016 | Vea | G06Q 20/3255 |
| | | | | 705/41 |
| 2016/0253663 | A1* | 9/2016 | Clark | G06Q 20/3274 |
| | | | | 705/75 |
| 2016/0321663 | A1* | 11/2016 | Batlle | G06Q 20/405 |
| 2016/0342989 | A1* | 11/2016 | Davis | G06Q 20/3827 |
| 2016/0371661 | A1* | 12/2016 | Shah | G06Q 20/401 |
| 2017/0017942 | A1* | 1/2017 | Nix | G06Q 20/40 |
| 2018/0357635 | A1* | 12/2018 | White, III | G06K 19/06187 |

OTHER PUBLICATIONS

"Decoupled debit card," retrieved from https://en.wikipedia.org/wiki/Decoupled_debit_card on Jun. 13, 2017 (2 pages).
Benson, "Why Debit Cards Aren't a Product," Glenbrook Partners, Apr. 23, 2009 (retrieved from http://paymentsviews.com/2009/04/23/why-debit-cards-aren%E2%80%99t-a-product/ on Jun. 13, 2017) (8 pages).
Steele, "Target REDcard Review—Debit Card with 5% Discounts at Target," retrieved from http://www.moneycrashers.com/target-redcard-review-debit-card-cash-back/ on Jun. 13, 2017 (3 pages).
Horton et al., "Innovations in Payments and Decoupled Debit Reshape the Power of Merchant Loyalty Programs," First Data Corporation, 2009 (11 pages).
"Receiving Payments," retrieved from https://www.payquicker.com/index.php/why-payquicker/receiving-payments on Jun. 173, 2017 (1 page).

* cited by examiner

REAL-TIME EXECUTION OF DATA EXCHANGES BETWEEN COMPUTING SYSTEMS BASED ON SELECTIVELY ALLOCATED PARAMETERS

TECHNICAL FIELD

The disclosed embodiments generally relate to computer-implemented systems and processes that automatically execute exchanges of data between network-connected devices in a computing environment based on selectively allocated parameters.

BACKGROUND

Today, payment systems and related technologies continuously evolve in response to advances in payment instruments, such as the ongoing transition from physical transaction cards to digital payment instruments maintained on mobile devices. These innovations result in additional mechanisms for submitting payment to an electronic or physical merchant and for flexibly funding transactions initiated by the electronic or physical merchant, and extend beyond the capabilities of card-based payment systems that administer and interact with point-of-sale (POS) devices disposed at merchant locations.

SUMMARY

The disclosed embodiments include computer-implemented systems and processes that initiate, approve, and execute exchanges of data between network-connected systems, apparatus, and devices in a computing environment.

For example, in some embodiments, an apparatus includes a storage unit storing instructions, a communications unit, and at least one processor coupled to the communications unit and the storage unit. The at least one processor is configured to execute the instructions to receive, through the communications unit, a first value of a parameter that characterizes an exchange of data initiated at a terminal device and an identifier of a client device involved in the initiated data exchange. The client device can be in communication with the terminal device across a corresponding communications channel. The at least one processor is further configured to execute the instructions to identify a second value of the parameter allocated to the client device, determine that the first parameter value characterizing the initiated data exchange exceeds the second parameter value allocated to the client device, and in response to the determination, request parameter data from an application program executed by the at least one processor. The request can be provided to the executed application through a programmatic interface. The at least one processor is further configured to execute the instructions to receive the parameter data from the executed application program through the programmatic interface. The parameter data can identify a third value of the parameter allocated to the client device by the executed application program, the third parameter value can correspond to a difference between the first and second parameter values. The at least one processor is further configured to execute the instructions to authorize, based on the second and third parameter values, a performance of the initiated data exchange in accordance with the first parameter value, and transmit, through the communications unit, confirmation data indicative of the authorized performance of the initiated data exchange to the terminal device.

In further embodiments, a computer-implemented method includes receiving, through a communications unit, and by at least one processor, a first value of a parameter that characterizes an exchange of data initiated at a terminal device and an identifier of a client device involved in the initiated data exchange. The client device can be in communication with the terminal device across a corresponding communications channel. The computer-implemented method also includes identifying, by the at least one processor, a second value of the parameter allocated to the client device, determining, by the at least one processor, that the first parameter value characterizing the initiated data exchange exceeds the second parameter value allocated to the client device, and in response to the determination, requesting, by the at least one processor, parameter data from an application program executed by the at least one processor. The request can be provided to the executed application through a programmatic interface. The computer-implemented method also includes receiving, by the at least one processor, the parameter data from the executed application program through the programmatic interface. The parameter data can identify a third value of the parameter allocated to the client device by the executed application program, and the third parameter value can correspond to a difference between the first and second parameter values. Based on the second and third parameter values, the computer-implemented method includes authorizing, by the at least one processor, a performance of the initiated data exchange in accordance with the first parameter value, and transmitting, through the communications unit, and by the at least one processor, confirmation data indicative of the authorized performance of the initiated data exchange to the terminal device.

Further, in some embodiments, an apparatus includes a storage unit storing instructions, a communications unit, and at least one processor coupled to the communications unit and the storage unit. The at least one processor is configured to execute the instructions to receive, through the communications unit, a first value of a parameter that characterizes an exchange of data initiated at a terminal device and an identifier of a client device involved in the initiated data exchange. The client device can be in communication with the terminal device across a corresponding communications channel. The at least one processor is further configured to execute the instructions to identify a second value of the parameter allocated to the client device, determine that the first parameter value characterizing the initiated data exchange exceeds the second parameter value allocated to the client device, and in response to the determination, transmit, through the communications unit, a request for parameter data to a computing system. The computing system can be configured to execute an application that generates the parameter data in response to the request, and the request can be provided to the executed application through a programmatic interface. The at least one processor is further configured to execute the instructions to receive the parameter data from the computing system through the communications unit. The parameter data can identify a third value of the parameter allocated to the client device by the executed application program, and the third parameter value can correspond to a difference between the first and second parameter values. The at least one processor is further configured to execute the instructions to authorize, based on the second and third parameter values, a performance of the initiated data exchange in accordance with the first parameter value, and transmit, through the communications unit, confirmation data indicative of the authorized performance of the initiated data exchange to the terminal device.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed embodiments as set forth in the accompanying claims.

DETAILED DESCRIPTION

Figure 1:
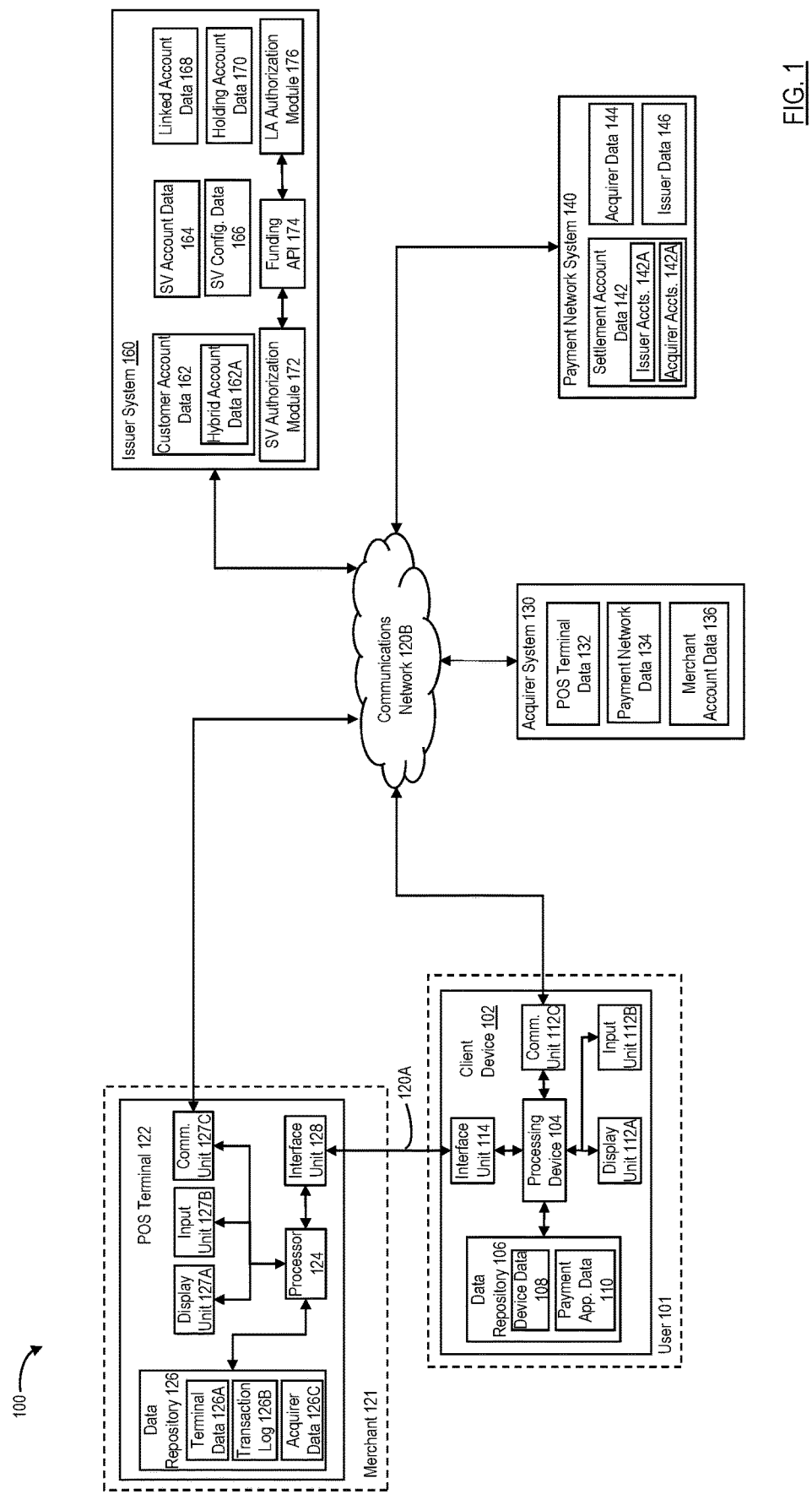
FIG. 1 is a diagram of an exemplary computing environment, consistent with disclosed embodiments.

Reference will now be made in detail to the disclosed embodiments, examples of which are illustrated in the accompanying drawings. The same reference numbers in the drawings and this disclosure are intended to refer to the same or like elements, components, and/or parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the described subject matter.

This specification describes exemplary computer-implemented apparatuses, devices, and processes that, among other things, perform operations for initiating, approving, and performing exchanges of data between network-connected devices in a computing environment. In certain aspects, and as described below, a terminal device may establish communications with a client device across a direct channel of communication, and may perform operations that initiate an exchange of data with that client device across the direct communications channel. The initiated data exchange may be characterized by a value of a data-exchange parameter (e.g., a first parameter value), and the terminal device may transmit data that characterizes the initiated data exchange and identifies the client device to a computing system associated with the client device, e.g., directly across an appropriate communications network or indirectly through one or more intermediate devices or communications systems across the communications network. The computing system may, upon execution of stored software instructions, perform any of the exemplary processes described herein to authorize a performance of the initiated data exchange in accordance with the first parameter value.

In one aspect, the computing system may receive the transmitted data, and may identify a second value of the data-exchange parameter allocated to the client device. The computing system may compare the identified second value of the data exchange parameter against the received first value of the data exchange parameter, and based on a determination that identified second value exceeds the received first value, the computing system may authorize a performance of the initiated data exchange in accordance with the first value of the data-exchange parameter. The computing system may transmit data indicative of the authorized performance of the initiated data exchange to the terminal device, e.g., directly across the communications network or indirectly through the one or more intermediate devices or computing systems.

In other aspects, the computing system may determine that the received first value of the data-exchange parameter exceeds the identified second value, and accordingly, the computing system may elect not to authorize the performance of the initiated data exchange based solely on the second value of the data-exchange parameter allocated to the client device. In response to this determination, the computing system may generate a request for parameter data generated by an executed application program, and may provide the generated request to the executed application program through a programmatic interface, such as an application programming interface (API) associated with the executed application program. The application program may, by way of example, be executed by at least one processor of the computing system, or alternatively, may be executed by at least one processor of an additional computing system accessible across the communications network.

The computing system may receive the requested parameter data through the programmatic interface, and may process the parameter data to identify a third value of the data-exchange parameter allocated to the client device by the executed application program. In some aspects, the third value of the data-exchange parameter corresponds to a difference between the first and second parameter values of the data-exchange parameter, and based on the sum of the second and third values of the data exchange parameter (e.g., as allocated to the client device), the computing system may authorize a performance of the initiated data exchange in accordance with the first value of the data-exchange parameter and transmit data indicative of the authorized performance of the initiated data exchange to the terminal device, e.g., directly across the communications network or indirectly through the one or more intermediate devices or computing systems, as described above.

In one aspect, the initiated data exchange may facilitate an approval and an execution of a transaction initiated at a network-connected device, such as a point-of-sale (POS) terminal associated by with a merchant, by a network-connected computing system based on funds allocated to a payment instrument of a customer that participates in the initiated transaction. Additionally, in further aspects, the network-connected computer system, such as a computing system maintained by a financial institution that issues the payment instrument, may provide an approval of that initiated transaction to the POS terminal in real-time and prior to the settlement of the initiated transaction.

The initiated transaction may, in certain instances, correspond to a purchase transaction in which the customer purchases a good or service from the merchant at an agreed-upon price (e.g., a transaction amount), and the POS terminal may be configured to receive data identifying the payment instruments available to the customer for use in the initiated transaction. Payment instruments consistent with the disclosed embodiments may include, but are not limited to, credit and debit card accounts held by the customer and issued by one or more financial institutions (e.g., issuers), checking or savings accounts held by the customer at one or more financial institutions, electronic funds transfers (e.g., e-transfers), and other accounts held by or available to the customer and capable of funding purchase transaction involving the user.

Payment instruments consistent with the disclosed embodiments may also include units of one or more digital currencies held by the customer in one or more corresponding accounts (e.g., units of Bitcoin™, Litecoin™, etc.), which may be used as an alternative to a fiat currency in purchase transactions involving the merchant. Transactions involving these digital-currency accounts (e.g., transfers of the customer's digital currency to other parties and/or transfers of digital currency held by the other parties to the customer) may be tracked within a distributed ledger data structure, such as a publicly accessible block-chain ledger that includes time-stamped and validated blocks representative of individual transactions or groups of transactions involving the customer's digital currency. Additionally, the disclosed embodiments may be configured to approve an initiated transaction in real-time based on a comparison of a corresponding transaction amount with an available balance of the customer's digital currency, which may be derived from the individual blocks of the block-chain ledger.

By way of example, a payment instrument may be encoded onto a computer-readable medium, such as a magnetic stripe disposed on a surface of a credit card and/or an EMV chip embedded within a smart card, and the POS terminal may include hardware, such as a wireless communications device, a chip reader, or a magnetic stripe reader, capable of obtaining encoded data identifying the payment instrument from the computer-readable medium. In other instances, a device operated by the customer, such as a smart phone, tablet computer, or a wearable computing device, may execute a payment-service application that establishes and maintains a digital wallet specifying one or more payment instruments, loyalty programs, and/or rewards programs available to the customer. As described below, when the customer disposes the device in proximity to the POS terminal device, the executed payment-service application may transmit data specifying a subset of the available payment instruments (e.g., account numbers, expiration dates, card-security codes (CSCs), issuer identifier numbers (IINs), accountholder names, etc.) to the POS terminal across a direct, short-range communications channel, along with data that uniquely identifies the maintained digital wallet and/or the customer (e.g., a digital wallet token and/or a digital wallet address).

In certain aspects, the POS terminal device may transmit the received payment-instrument data to a computing system that maintains and/or administers the POS terminal device (e.g., a computing system maintained by an acquirer institution or entity), along with cryptographic data identifying the POS terminal (e.g., a cryptogram generated by the payment-network computing system) and transaction data specifying parameters of the initiated transaction, such as a transaction amount, a transaction time or date, and identifiers of the purchased goods or services. The acquirer computing system may in turn route the received payment-instrument data and transaction data to a computing system associated with a payment network appropriate to the transaction and payment instrument (e.g., payment rails maintained by Visa™ or Mastercard™). In response to the received data, the payment-network computing system may perform operations that approve the initiated transaction involving the customer's payment instrument (e.g., based on an authorization decision by a computer system associated with an issuer of the payment instrument), settle the approved transaction in accordance with the transaction parameters, and provide a confirmation of the approved transaction to the POS terminal device via the acquirer computing system for presentation to the customer.

In one instance, the payment instrument may include a stored-value payment instrument, such as an open-loop, stored-value account issued by a financial institution and usable for purchase transactions involving merchants associated with the payment networks described above. In some aspects, and prior to use in a purchase transaction involving a merchant, a customer may access a web page or other digital portal associated with the issuer of the open-loop, stored-value account (e.g., using a smart phone or other network-connected device), and provide input to that web page or digital portal that initiates a transfer funds from a financial services account of the customer to the stored-value account maintained by the issuing financial institution. Upon execution and settlement, the transfer of funds may "load" the stored-value account with funds available for use in purchase transactions, and a computing system of the issuing financial institution (e.g., an "issuer" computing system) may maintain, within one or more structured data repositories, data associating the stored-value account with the transferred funds, which the issuer computing system may access during authorization of subsequent purchase transactions involving the stored-value account and adjust to reflect a transaction amount of these purchases (e.g., by reducing an available balance of the transferred funds).

The issuer computing system may, for example, rely on the maintained balance of available funds to authorize or decline purchase transactions involving the stored-value account without the resource-intensive application of risk-assessment techniques to data characterizing the stored-value account and the merchant. The resulting reduction of the computational load may, in some instances, be balanced by an increased consumption of computational and network resources by both the customer's device, which accesses the web page or digital portal to initiate transfers of funds that maintain the balance of the stored-value account, and the computing systems maintained by the financial institutions and intermediaries that perform operations to execute, clear, and settle the initiated transfers. Further, as the data specifying the stored-value account (e.g., account number, expiration data, card-security code (CSC), etc.) is directly tied to the available balance maintained by the issuer computing system, the POS terminal and the acquirer system (and additionally or alternatively, the payment-network computing system and the issuer computing system) locally stores cryptographic data sufficient to tokenize or encrypt portions of the stored-value account data prior to transmission across one or more communications networks.

In other instances, the payment instrument may include a decoupled debit account, which may be issued by a financial institution (or other business entity) and which may be funded by an underlying financial services account issued by a different financial institution. By way of example, a customer may obtain the decoupled debit account from the issuing financial institution, and may access a web page or other digital portal associated with that issuing financial institution to configure the decoupled debit account and specify the underlying financial services account (e.g., a demand deposit account, credit card account, debit card account, etc.) that funds purchase transactions involving the decoupled debit account.

During authorization of transactions involving the decoupled debit account, the POS terminal may route identifying the decoupled debit account (e.g., an account number, expiration date, CSC, etc.) and the corresponding transaction data to the appropriate payment-network computing system, which may relay the decoupled debit account data and that transaction data to a computing system associated with the issuing financial institution (e.g., the issuer computing system). In some aspects, the issuer computing system may apply one or more risk-assessment processes to the decoupled debit account data and the transaction data, and responsive to a positive outcome, may authorize the initiated transaction involving the decoupled debit account. In response to the authorization, the issuer computing system may perform operations that clear and settle the authorized purchase transaction based not on interaction with the payment-network computing system, but instead through an initiation of an electronic automatic clearinghouse (ACH) transaction that transfers funds in the amount of the purchase transactions directly from the underlying financial services account (e.g., which funds the decoupled debit account) to a merchant account maintained by the acquirer computing system.

The approval of the initiated transaction may not occur in real time, as the issuer computing system may apply resource-intensive risk-assessment processes to the decoupled debit-account data and the transaction data prior authorizing the initiated transaction and submitting the now-authorized purchase transaction for payment using electronic ACH processing (e.g., the electronic transfer of funds from the underlying DDA to the merchant account). Moreover, while the clearance and settlement of the initiated transaction via the electronic ACH processing may reduce the interchange fees imposed on the merchant on a per-transaction basis, the reliance on the electronic ACH processing may result in significant lag between the initiation of the purchase transaction using the decoupled debit account and the subsequent deposit of funds corresponding to that purchase transaction (e.g., as adjusted for imposed interchange fees) in the merchant account.

Certain of the exemplary, computer-implemented processes described below, which provide a real-time approval and funding of an initiated transaction involving a "hybrid" payment instrument flexibly structured to include a stored-value account linked to an underlying financial services account, may be implemented in addition to or as an alternate to conventional payment processes, such as those that condition the approval of an initiated transaction on a performance of computationally intensive risk-assessment processes and further, on a performance of back-end clearance and settlement processes requiring resource-intensive communications between the various computing systems maintained by administrators of a POS network, one or more payment networks, and/or issuers of payment instruments. By eliminating the need to implement the computationally intensive risk-assessment processes, certain of the disclosed embodiments may increase an efficiency at which computer systems operate to authorize, clear, and settle initiated transactions, and further, reduce a volume and complexity of network communications exchanged between these computer systems during authorization, clearance, and settlement, as described below.

Moreover, many POS terminal and consumer payment devices, such as those described above, incorporate sophisticated processing and storage technologies that facilitate a tokenization or an encryption of portions of payment-instrument data prior to transmission to the acquirer computing system, the payment-network computing system, and/or the issuer of the computing system. Certain of the exemplary, computer-implemented processes described below, which decouple the account data of the hybrid payment instrument from data identifying the underlying funding account, facilitate the transmission of account data from the POS terminal and/or consumer payment device to the acquirer computing system without tokenization and encryption, and may be implemented by mobile and wearable devices characterized by reduced-functionality processing and storage technologies. These exemplary computer-implemented processes may, in some aspects, be implemented in addition to or as an alternate to conventional payment processes, which require sophisticated POS terminals and consumer payment devices capable of selectively or encrypting portions of the payment-instrument data prior to transmission.

I. Exemplary Computing Environments

FIG. 1 is a diagram illustrating an exemplary computing environment 100, consistent with certain disclosed embodiments. As illustrated in FIG. 1, environment 100 may include a client device 102, which may be in communication with a point-of-sale (POS) terminal 122 across a direct channel of communications, e.g., communication channel 120A. Environment 100 also includes an acquirer system 130, a payment network system 140, and an issuer system 160, each of which may be interconnected to POS terminal 122 and client device 102 through any appropriate combination of communications networks, such as network 120B.

In one aspect, communications channel 120A may correspond to a wireless communications channel established across a short-range communications network, examples of which include, but are not limited to, a wireless LAN, e.g., a "Wi-Fi" network, a network utilizing RF communication protocols, a NFC network, a network utilizing optical communication protocols, e.g., infrared (IR) communications protocols, and any additional or alternate communications network, such as those described above, that facilitate peer-to-peer (P2P) communication between POS terminal device 102 and client device 122. Further, examples of network 120B include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

POS terminal 122 may, in some instances, be associated with a merchant, e.g., merchant 121, and client device 102 may be associated with or operated by a customer of merchant 121, e.g., user 101. For example, POS terminal 122 may be disposed within a physical location of merchant 121, such as a location where a customer, e.g., user 101, provides payment for goods and/or services (e.g., at a cash register at merchant 121). In one aspect, client device 102 may correspond to a consumer payment device that, upon establishing communication with POS terminal 122 across communications channel 120A, provides data to POS terminal 122 specifying a payment instrument available for use in an initiated transaction for the goods and/or services.

The payment instrument may, in some instances, be issued to user 101 by a financial institution, e.g., a financial institution that operates issuer system 160, and issuer system 160 may perform operations that provide the executable payment application to client device 102 for storage within the one or more tangible, non-transitory memories. Payment instruments consistent with the disclosed embodiments include, but are not limited to, a credit or debit card accounts held by user 101, an account that includes units of one or more digital currencies held by user 101, a checking or savings account held by user 101 at one or more financial institutions, an electronic funds transfer, and/or other accounts held by or available to user 101 and capable of funding purchase transaction initiated at POS terminal devices operating within environment 100, such as POS terminal 122.

For example, and as described herein, the payment instrument may include an open-loop, hybrid account that incorporates a stored-value account issued by a financial institution (e.g., the financial institution that operates issuer system 160) and an underlying financial services account (e.g., a demand deposit account, a credit-card account, etc.) issued by that financial institution and flexibly and selectively linked to the stored-value account and the hybrid payment instrument by user 101. In certain instances, linked accounts consistent with the disclosed embodiments may include, but are not limited to, credit card accounts, debit card accounts, or demand deposit accounts held by the financial institution that operates issuer system 160.

In an embodiment, client device 102 may include a computing device having one or more tangible, non-transitory memories that store data and/or software instructions, and one or more processors, e.g., processor 104, configured to execute the software instructions. The one or more tangible, non-transitory memories may, in some aspects, store software applications, application modules, and other elements of code executable by the one or more processors, such as a web browser, an application associated with issuer system 160 (e.g., a mobile application), and additionally or alternatively, a payment application associated with a payment service (e.g., a mobile application that establishes and maintains a mobile wallet), as described below.

Client device 102 may also establish and maintain, within the one or more tangible, non-tangible memories, one or more structured or unstructured data repositories or databases, e.g., data repository 106, that include device data 108 and payment-application data 110. In one instance, device data 108 may include data that uniquely identifies client device 102, such as a media access control (MAC) address of client device 102 or an IP address assigned to client device 102. Further, in additional instances, payment-application data 110 may include one or more identifiers of the payment application (e.g., a wallet address assigned to the mobile wallet established and maintained by the executed payment application), data identifying one or more payment instruments available to the executed payment application (e.g., as loaded into the established mobile wallet), and additional data supporting an operation of the executed payment application (e.g., a mobile wallet cryptogram provided to POS terminal 122 to validate the established mobile wallet, etc.). The disclosed embodiments are, however, not limited to these examples of device and payment-application data, and in further aspects, data repository 106 may include any additional or alternate data appropriate to client device 102 and the executed payment application.

Referring back to FIG. 1, client device 102 may also include a display unit 112A configured to present interface elements to user 101, and an input unit 112B configured to receive input from user 101, e.g., in response to the interface elements presented through display unit 112A. By way of example, display unit 112A may include, but is not limited to, an LCD display unit or other appropriate type of display unit, and input device 112B may include, but input not limited to, a keypad, keyboard, touchscreen, voice activated control technologies, or appropriate type of input device. Further, in additional aspects (not depicted in FIG. 1), the functionalities of display unit 112A and input unit 112B may be combined into a single device, e.g., a pressure-sensitive touchscreen display unit that presents interface elements and receives input from user 101. Client device 102 may also include a communications unit 112C, such as a wireless transceiver device, coupled to processor 104 and configured by processor 104 to establish and maintain communications with network 120B using any of the communications protocols described herein.

Further, in some aspects, client device 102 may include an interface unit 114, which can be configured by processor 104 to establish and maintain communications with POS terminal 122 (e.g., through interface unit 128 of FIG. 1) across communications channel 120A. For example, each of interface unit 114 and interface unit 128 may include a communications device, e.g., a wireless transceiver device, capable of exchanging data across communications channel 120A using any of the short-range communications protocols described above (e.g., NFC protocols, RF communications protocols, Bluetooth™ communication protocols, optical communications protocols, etc.). In other examples, interface unit 114 may include one or more electrical connectors capable of engaging with corresponding electrical connectors of interface unit 128 of POS terminal 122, or an electrical connector capable receiving a wired connection with POS terminal 122 (e.g., a USB connector, etc.).

Examples of client device 102 may include, but are not limited to, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform operations, and/or display information on an interface module, consistent with disclosed embodiments. In some instances, user 101 may operate client device 102 and may do so to cause client device 102 to perform one or more operations consistent with the disclosed embodiments.

In other examples, client device 102 may include a reduced-functionality device, such as a tamper-resistant integrated circuit embedded within a smart payment card, or a personal wearable form factor that incorporates processing and storage functionalities. The reduced-functionality device may include processor 104, and one or more tangible, non-transitory memories maintaining data repository 106 and storing software instructions and executable application modules that, when executed by processor 104, cause the reduced-functionality device to perform operations consistent with the disclosed exemplary embodiments. For instance, the stored software instructions may include an executable payment application linked to a payment instrument available to fund purchase transactions initiated at POS terminals operating within environment 100, such as POS terminal 122. The payment application, when executed by processor 104, can cause the reduced-functionality device to transmit data characterizing the available payment instrument to POS terminal 122 across communications channel 120A (e.g., through interface unit 114), and as described below, POS terminal 122 can perform any of the exemplary processes described herein to execute the purchase transactions in accordance with the transmitted data.

In one aspect, interface unit 114 of the smart payment card may include a communications device that facilitates an initiation of a contactless, EMV-based transaction with POS terminal 122. For example, when the smart payment card is disposed proximate to interface unit 128 of POS terminal 122 (e.g., within 4 centimeters), the communications device can be configured to transmit data characterizing the available payment instrument across communications channel 120A to POS terminal 122 using any of the short-range, wireless communications protocols described above, such as NFC protocols or Bluetooth™ communications protocols. Interface unit 120 of POS terminal 122 can receive the transmitted data, which characterizes the available payment instrument, and POS terminal 122 can perform any of the exemplary processes described herein to execute initial purchase transactions in accordance with the transmitted data.

In other aspects, interface unit 114 of the smart payment card may include one or more electrical connectors configured to mechanically engage corresponding electrical connectors of interface 128 when user 101 disposes the smart payment card into a device (e.g., a EMV-compatible chip reader) incorporated into POS terminal 122. The disposition of the smart payment card into the EMV-compatible chip reader, and the mechanical engagement of the one or more electrical connectors of the interface units 114 and 128, can establish communications channel 120A and supply electrical energy to the tamper-resistant integrated circuit. The electrical energy supplied to the tamper-resistant integrated circuit can, in some instances, initiate a contact-based EMV transaction between the smart payment card and POS terminal 122. For example, interface unit 114 can be configured to transmit data characterizing the available payment instrument across mechanically established communications channel 120A to POS terminal 122, which can perform any of the exemplary processes described herein to execute initial purchase transactions in accordance with the transmitted data.

Referring back to FIG. 1, POS terminal 122 may correspond to a computing device that includes one or more tangible, non-transitory memories storing data and/or software instructions, and one or more processors, e.g., processor 124, configured to execute the software instructions. The one or more tangible, non-transitory memories may, in some aspects, store software applications, application modules, and other elements of code, which when executed by the one or more processors, cause POS terminal 122 to perform operations consistent with the disclosed embodiments, as described below. Further, in certain aspects, POS terminal 122 may also store and maintain a data repository, e.g., data repository 126, within the one or more tangible, non-transitory memories. Data repository 126 may, for example, include terminal data 126A that uniquely identifies POS terminal 122 within network 120B, a transaction log 126B that identifies transactions initiated at POS terminal 122 and authorized using any of the exemplary processes described herein, and/or acquirer data 126C that uniquely identifies a computer system (e.g., a MAC address, an IP address, etc.) of an entity, e.g., an acquirer, that administers POS terminal 122 and other POS terminals operating in environment 100.

As described above, POS terminal 122 may be disposed within a physical location of the merchant, such as a location where a customer, such as user 101, may provide payment for goods and/or services (e.g., at a cash register at the merchant). POS terminal 122 may, in some instances, include a display unit 127A configured to present interface elements to user 101, and an input unit 127B configured to receive input from user 101, e.g., in response to the interface elements presented through display unit 127A. By way of example, display unit 127A may include, but is not limited to, an LCD display unit or other appropriate type of display unit, and input device 127B may include, but input not limited to, a keypad, keyboard, touchscreen, voice activated control technologies, or appropriate type of input device. Further, in additional aspects (not depicted in FIG. 1), the functionalities of display unit 127A and input unit 127B may be combined into a single device, e.g., a pressure-sensitive touchscreen display unit that presents interface elements and receives input from user 101.

POS terminal 122 may also include a communications unit 127C, such as a wireless transceiver device, coupled to processor 124 and configured by processor 124 to establish and maintain communications with network 120B using any of the communications protocols described herein. Further, POS terminal 122 may include an interface unit 128, which may be configured by processor 124 to establish and maintain communications with client device 102 (e.g., through interface unit 114 of FIG. 1) across communications channel 120A.

In some aspects, interface unit 128 may include a communications device, such as a wireless transceiver device, capable of exchanging data with client device 102 using any of the short-range communications protocols described above (e.g., NFC protocols, RF communications protocols, Bluetooth™ communication protocols, optical communications protocols, etc.). For example, the communications device included within interface unit 128 can facilitate an initiation of a contactless, EMV-based transaction with client device 102, and interface unit 128 can exchange data characterizing an available payment instrument with interface unit 114 of client device 102 across communications channel 120A using NFC protocols or Bluetooth™ communication protocols.

In other aspects, interface unit 128 can include one or more electrical connectors capable of engaging with corresponding electrical connectors of interface unit 114, or an electrical connector capable receiving a wired connection with client device 102 (e.g., a USB connector, etc.). For example, the mechanical engagement of the one or more electrical connectors of the interface units 114 and 128 can establish communications channel 120A and supply electrical energy to client device 102 (e.g., the tamper-resistant integrated circuit included within the smart payment card). The supplied electrical energy can, in some instances, initiate a contact-based EMV transaction between the client device 102 and POS terminal 122, and interface unit 128 may be configured to exchange data characterizing the available payment instrument with client device 102 across mechanically established communications channel 120A.

Examples of POS terminal 122 may include, but are not limited to, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform operations consistent with disclosed embodiments. Further, although not depicted in FIG. 1, POS terminal 122 may also be coupled to a computing system associated with and maintained by merchant 121 (e.g., a cash register, etc.), which may include one more processors and one of more tangible, non-transitory memories storing one or more software applications, application modules, and other elements of code that, when executed by the one or more processors, cause the merchant computing system to exchange data with POS terminal 122 and perform operations consistent with the disclosed embodiments.

The disclosed embodiments are not limited to such POS terminals, and in additional aspects, POS terminal 122 may correspond to one or more application modules executed by a computer system maintained by merchant 111, one or more computing systems operating within environment 100, one or more client devices operating within environment 100, such as client device 102. In other embodiments, POS terminal 122 may represent a device communicatively coupled to client device 102 to provide mobile point-of-sale and payment services, such as a Square™ device in communication with client device 102.

Referring back to FIG. 1, acquirer system 130, payment network system 140, and acquirer system 160 may each represent a computing system that includes one or more servers (e.g., not depicted in FIG. 1) and tangible, non-transitory memory devices storing executable code and application modules. Further, the servers may each include one or more processor-based computing devices, which may be configured to execute portions of the stored code or application modules to perform operations consistent with the disclosed embodiments, including operations consistent with the exemplary flexible, real-time transaction authorization, clearance, and settlement processes described herein. In other instances, and consistent with the disclosed embodiments, one or more of acquirer system 130, payment network system 140, and acquirer system 160 may correspond to a distributed system that includes computing components distributed across one or more networks, such as network 120B, or other networks, such as those provided or maintained by cloud-service providers.

In some aspects, acquirer system 130 may perform operations that administer one or more POS terminal devices operating within environment 100, such as POS terminal 122. As illustrated in FIG. 1, acquirer system 130 may maintain, within the one or more tangible, non-transitory memories, POS terminal data 132 that identifies one or more of the POS terminal devices administered by acquirer system 132 (e.g., an IP address, MAC address, or other unique device identifier of POS terminal 122), payment network data 134 that identifies one or more payment networks capable of clearing and settling purchase transaction initiated by POS terminals administered by acquirer system 130 (e.g., an IP address or other network identifier of payment network system 140), and merchant account data 136 that identifies accounts held by merchants associated with the POS terminal devices operating within environment 100 (e.g., merchant 121 that operates POS terminal 122). In certain instances, and as described below, the merchant accounts may receive proceeds from one or more authorized purchase transactions, which may be cleared and settled using any of the exemplary purchase transaction clearance and settlement processes described herein.

Payment network system 140 may perform operations that clear and settle authorized purchase transactions in using one or more exemplary purchase transaction clearance and settlement processes. In certain aspects, and to facilitate a performance of these exemplary clearance and settlement processes, payment network system 140 may maintain settlement account data 142, acquirer data 144, and issuer data 146 within the one or more tangible, non-transitory memories.

For example, payment network system 140 may, in some instances, establish and maintain an issuer settlement account on behalf of each issuer computing system operating in environment 100 (e.g., issuer settlement account 142A associated with issuer system 160), and further, establish and maintain an acquirer settlement account on behalf of each acquirer computing system operating in environment 100 (e.g., acquirer settlement account 142B associated with acquirer system 130). Acquirer data 144 may include data that uniquely identifies one or more acquirer computing systems that administer POS terminals operating within environment 100 (e.g., an IP address, MAC address, or other unique device identifier of acquirer system 130 that administers POS terminal 122). Further, in some instances, issuer data 146 may include data that uniquely identifies computer systems maintained by one or more issuers of payment instruments involved in purchase transactions initiated at POS terminal 122 (e.g., an IP address, MAC address, or other unique identifier of issuer system 160).

Issuer system 160 may maintain, within the one or more tangible, non-transitory memories, data that facilitates an authorization of purchase transactions initiated at POS terminal devices operating within environment 100 and involving issued payment instruments available to user 101, e.g., as specified by data provided to POS terminal 122 by client device 102 across communications channel 120A. As illustrated in FIG. 1, issuer system 160 may maintain customer account data 162 that identifies underlying accounts (e.g., account numbers, expiration dates, assigned CSCs, etc.) associated with each of the payment instruments issued by issuer system 160. In one aspect, customer account data 162 may also include hybrid account data 162A uniquely identifies an exemplary open-loop, hybrid payment-instrument, which as described below, selectively and flexibly links a stored-value account issued by a financial institution (e.g., an "SV" account issued by issuer system 160) to an underlying financial services account issued by that financial institution (e.g., a "linked" account).

Referring to FIG. 1, issuer system 160 may also maintain, within the one or more tangible, non-transitory memories, stored-value (SV) account data 164, stored-value (SV) configuration data 166, linked account data 168, and holding account data 170. In one aspect, and consistent with the disclosed embodiments, SV account data 164 may include data that identifies the unique SV account linked to the hybrid payment instrument (e.g., and associated with the account data specified hybrid account data 162A), a current balance of funds allocated to the SV account (and thus, allocated to the hybrid payment instrument), and a data log identifying one or more prior "funding" transactions that allocated the funds to the SV account. Further, SV configuration data 166 may identify one or more selectively established restrictions that, in some instances, restrict or limit an involvement of the hybrid payment instrument, and the underlying SV account and linked account, in funding a particular initiated transaction.

For example, and as described below, the restrictions may specify that the SV account, and the underlying SV account balance, fund only specific transactions, or alternatively, specific portions of transactions, and may require that the underlying linked account fund any outstanding portion of the transactions. Restrictions consistent with the disclosed embodiments may include, but are not limited to, temporal or geographic restrictions (e.g., that the stored-value account balance funds purchase transactions initiated during specified time period or specified geographic locations), restrictions based on transaction context (e.g., that the stored-value account funds initiated transactions involving specific goods, services, merchants), or transaction-value-based restrictions (e.g., that the stored-value account balance funds transactions having a transaction amount below a specified threshold, or funds up to a specified threshold portion of the transaction amount). The disclosed embodiments are not limited to these exemplary restrictions, and in further aspects, SV configuration data 166 may identify any additional or alternate funding restriction appropriate to the hybrid payment instrument, the underlying SV and linked accounts, and the initiated transaction. Further, in some aspects, one or more of the restrictions may be established by user 101 using any of the exemplary configuration processes described below, and additionally or alternatively, may be established programmatically by issuer system 160, e.g., in response to potential fraudulent activity, transaction velocity, etc.

Linked account data 168 may, in some embodiments, include a status parameter indicative of an availability of the linked account to fund portions of purchase transactions initiated and authorized in accordance with the disclosed embodiments and further, data identifying the linked account (e.g., an account number, expiration data, CSC code, etc.). In certain aspects, a value of the status parameter of the hybrid payment instrument may specify whether user 101 elected to link that hybrid payment instrument (and its underlying SV account) to an underlying financial services account, and when user 101 elected to link the financial services account to the hybrid payment instrument, an availability of that linked account to fund portions of initiated transactions involving the hybrid payment instruments.

In certain aspects, described below, user 101 may selectively configure the hybrid payment instrument to specify the linked account (e.g., the account number, expiration data, CSC code, etc.) and further, to establish the value of the status parameter that characterizes the availability of the linked account to fund purchase transactions involving the hybrid payment instrument. For example, user 101 may access, via client device 102, a web page or other digital portal associated with issuer system 160, and may input configuration data to client device 102 that specifies the linked financial services account, modifies a previously linked financial services account, and/or establishes or modifies the value of the status parameter associated with the linked account. Client device 102 may transmit the configuration data across network 120B to issuer system 160, and issuer system 160 may configure the hybrid payment instrument in accordance with any of the exemplary processes described herein.

The received configuration data may, in some instances, include information specifying the linked account and characterizing the ability of the linked account to fund purchase transactions involving the hybrid payment instrument (e.g., as input into client device 102), and in certain aspects, issuer system 160 may perform operations that generate, or modify, a value of the status parameter consistent with the received configuration data. For example, the status parameter value may indicate that the linked account is "enabled" when the linked account is available to fund initiated transactions involving the hybrid payment instrument, or alternatively, that the linked account is "disabled" when the linked account is unavailable to fund initiated transactions involving the hybrid payment instrument. In some instances, issuer system 160 may perform operations that associate the information specifying the linked account and the status parameter value with data uniquely identifying the hybrid payment instrument (e.g., an account number, etc.), and store with linked account information and status parameter value within a portion of linked account data 168.

In other instances, the received configuration data may not include information specifying the linked account. For example, and in the absence of the linked account information, issuer system 160 may establish a default values of "null" for the status parameter and the linked account information (e.g., indicating that purchase transactions initiated using the hybrid payment instrument will be authorized on the basis of a balance of funds allocated to the SV account of the hybrid payment instrument). Issuer system 160 may perform operations that associate the "null" values of the linked account information and the status parameter information with the data uniquely identifying the hybrid payment instrument (e.g., an account number, etc.), and store with linked account information and status parameter value within a portion of linked account data 168.

In other aspects, and consistent with the disclosed embodiments, issuer system 160 may programmatically configure the hybrid payment instrument without input from user 101. For example, issuer system 160 may perform operations that selectively configure, or reconfigure, the linked-account status of the hybrid payment instrument or the financial services account linked to the hybrid payment instrument in response to, among other things, detected abnormalities in the usage of one or more financial services accounts held by user 101, reports of fraud, or other appropriate conditions and events.

As further illustrated in FIG. 1, issuer system 160 may also store, within the one or more tangible, non-transitory memories, a stored-value (SV) authorization module 172, a linked account (LA) authorization module 176, and a funding API 174 that facilitates programmatic communication and exchanges of data between SV authorization module 172 and LA authorization module 176. As described below, and upon execution by one or more processors of issuer system 160, SV authorization module 172 may cause issuer system 160 to perform operations that authorize a portion of the initiated transaction involving the hybrid payment instrument based an available balance of funds previously allocated to the SV account and based on one or more restrictions imposed on the SV account by user 101 and/or issuer system 160. Further, and upon execution by the one or more processors, LA authentication module 176 may cause issuer system 160 to fund additional or alternate portions of the initiated transactions using the linked account of the hybrid payment instrument.

Referring back to FIG. 1, holding account data 170 may include data that records, for a particular authorized purchase transaction, transfers of funds from the SV account to a holding account, and additionally or alternatively, transfers of funds from the linked account to the holding account, in collective satisfaction of the transaction amount of the authorized purchase transaction. In certain embodiments, payment network system 140 may perform any of the exemplary processes clearance and settlement processes described herein to transfer the funds equivalent to the transaction amount from the holding account to issuer settlement account 142A, and subsequent to acquirer settlement account 142B, which may be accessed by acquirer system 130 for settlement into a corresponding merchant account specified within merchant account data 136.

II. Exemplary Computer-Implemented Processes for Initiating, Approving, and Executing Real-Time Exchanges of Data between Computing Systems based on Flexibly Allocated Data-Exchange Parameters In some embodiments, a network-connected device, such as POS terminal 122, may perform operations that initiate an exchange of data with a client device, e.g., client device 102, across a direct channel of communications established between client device 102 and POS terminal 122, e.g., communications channel 120A. As described above, the initiated data exchange may be characterized by a first value of a data-exchange parameter, and POS terminal 122, in conjunction with acquirer system 130, payment network system 140, and issuer system 160, may perform operations that authorize a perform of the initiated data exchange based on a second value of the data-exchange parameter previously allocated to client device 102, and additionally or alternatively, a third value of the data-exchange parameter flexibly allocated to client device 102 by an application program executed by issuer system 130.

The initiated data exchange may, in certain instances, facilitate a real-time authorization of a purchase transaction initiated at POS terminal 122 by a customer of merchant 121, e.g., user 101. For example, as described above, user 101 may elect to purchase lunch from merchant 121 (e.g., a local restaurant) for an agreed-upon price of $15.00 (e.g., the transaction amount). A computing system maintained by merchant 121 (e.g., a cash register) may obtain transaction data characterizing the initiated transaction, such as an identifier of the product or products involved in the transaction (e.g., user 101's lunch) and the corresponding transaction amount (e.g., $15.00), and provide the obtained transaction data to POS terminal 122 across any appropriate wired or wireless connection.

POS terminal device 122 may receive the transaction data from the computing system, and may perform operations that generate interface elements representative of portions of the received transaction data, which POS terminal 122 may present within a graphical user interface (GUI) displayed on display unit 127A. In response to the presented interface elements, which may prompt user 101 to provide a payment instrument capable of funding the $15.00 transaction amount of the initiated transaction, user 101 may dispose client device 102 proximate to POS terminal 122, and interface module 114 of client device 102 may establish communications channel 120A with POS terminal 122 (e.g., through the communications device included within interface unit 128 of POS terminal 122 using any of the short-range, wireless communication protocols described above).

In response to the establishment of communications channel 120A, processor 104 of client device 102 may execute a payment application (e.g., a mobile wallet application) that causes client device 102 to present, to user 101 through display unit 112A, interface elements that identify one or more payment instruments maintained within a mobile wallet established by the executed payment application and available to fund the initiated transaction. As described above, the identified payment instruments may include an open-loop, hybrid payment-instrument, which incorporates a stored-value account issued by a financial institution (e.g., the financial institution that operates issuer system 160) and an underlying financial services account (e.g., a linked account) that is issued by that financial institution and flexibly and selectively linked to the stored-value account. The presented interface elements may, in some instances, prompt user 101 to select a corresponding one of the payment instruments for use in the initiated transaction with merchant 111, as described below in reference to FIG. 2.

In further aspects, and consistent with the disclosed embodiments, the selected payment instrument may be encoded onto a computer-readable medium, such as a magnetic stripe disposed on a surface of a conventional payment card or alternatively, a tamper-resistant integrated circuit embedded within a smart payment card (e.g., additional examples of client device 102). For example, user 101 may present the smart payment card to POS terminal 122 to fund the purchase of the product(s) from merchant 121. Interface units of the smart payment card and the POS terminal (e.g., interface units 114 and 128, respectively) can establish communications channel 120A using any of the communications described above, such as NFC protocols or Bluetooth™ communications protocols, and can exchange data facilitating an initiation of an EMV-based contactless transaction.

Figure 2:
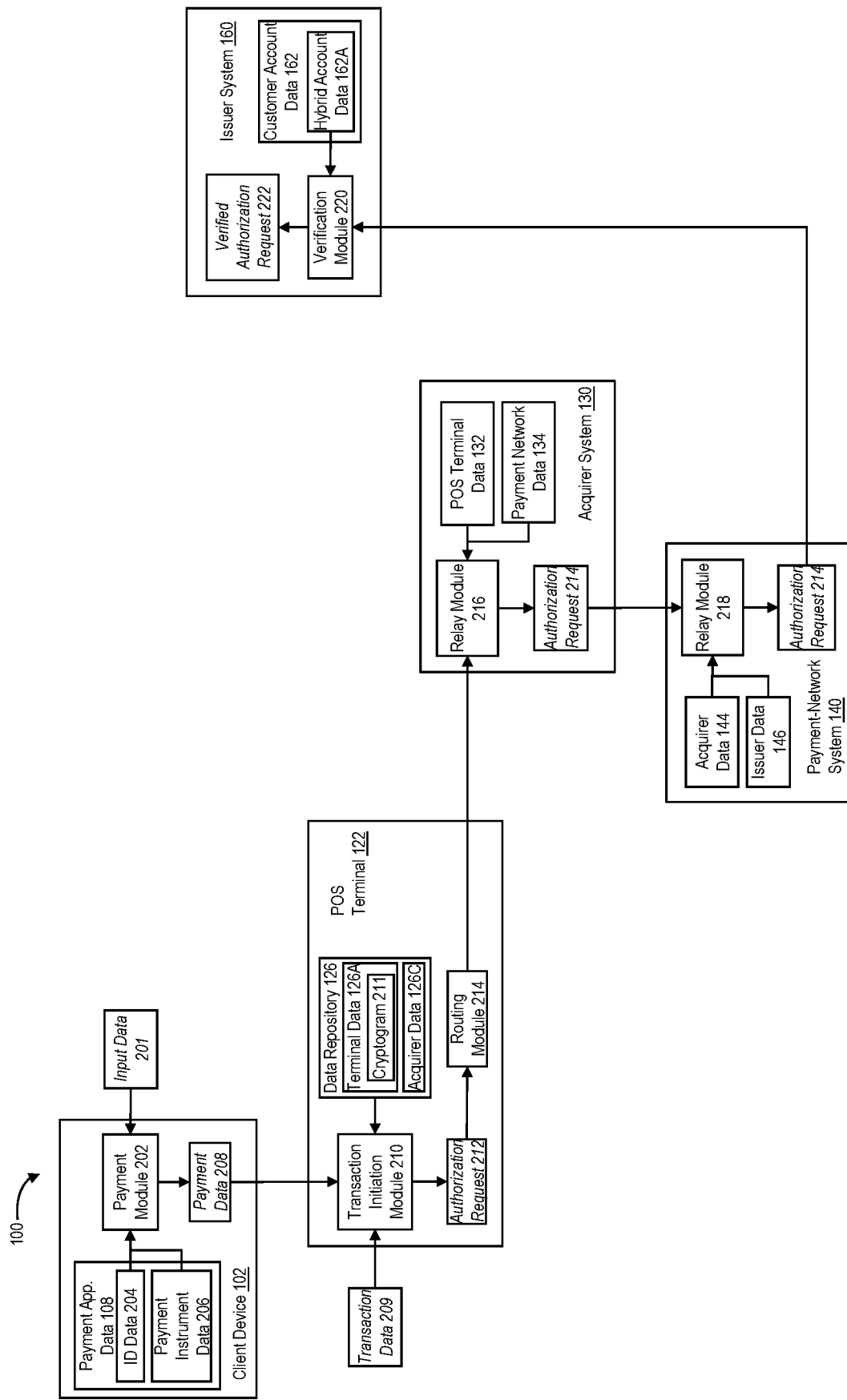
FIGS. 2, 3, 4A, and 4B are diagrams illustrating portions of an exemplary computing environment, consistent with the disclosed embodiments.

In other instances, user 101 may present the conventional or smart payment card to POS terminal 122 to fund the purchase of the product(s) from merchant 121, and POS terminal 122 may include hardware, such as a magnetic stripe reader or an EMV-compatible chip reader, capable of obtaining encoded data identifying the payment instrument from the computer-readable medium (not depicted in FIGS. 1 and 2). For example, the EMV-compatible chip reader (e.g., incorporated into interface unit 128 of POS terminal 122) may include electrical connectors configured to engage mechanically corresponding mechanical connectors of the tamper-resistant integrated circuit (e.g., included within interface unit 114). The mechanically engaged electrical connectors of interface units 114 and 128 can, in some instances, establish communications channel 120A and supply electrical energy to the tamper-resistant integrated circuit, as described above.

Additionally, in certain aspects, the selected payment instrument may be encoded within one or more tangible, non-transitory memories incorporated into a wearable computing device, such as a personal, wearable form factor capable of establishing communications and exchanging data, e.g., account data identifying the open-loop, hybrid payment instrument, with POS terminal 122 using any of the short-range, wireless communications protocols described above. Further, as account data that uniquely identifies the hybrid payment instrument may be decoupled from the underlying funding accounts, wearable computing devices, personal form factors, and other reduced-functionality devices may transmit potions of this account data across communications channel 120A to POS terminal 122 without tokenization and encryption, and thus, without the need for sophisticated over-the-air provisioning of payment tokens.

Referring to FIG. 2, a payment module 202 of client device 102 may receive, through input unit 127B, input data 201 that identifies a payment instrument available for use in the initiated transaction. As described above, payment module 202 may establish and maintain a mobile wallet that identifies one or more payment instruments available to fund the initiated payment transaction, and in response to input data 201, payment module 202 may perform operations that access identification data 204 and payment instrument data 206. In some instances, identification data 204 may include data that identifies the maintained digital wallet and/or the user 101 (e.g., a digital wallet token and/or a digital wallet address), and payment instrument data 204B may include data that identifies the payment instruments maintained by the payment module 202 within the mobile wallet (e.g., data identifying the hybrid payment instrument described above).

In some aspects, payment module 202 may obtain the digital wallet token and/or the digital wallet address from identification data 204, and may obtain a portion of payment instrument data 206 that corresponds to the identified payment instrument (e.g., an account number, expiration date, card-security code (CSC), issuer identifier number (IIN), accountholder name, etc.). For example, input data 201 may identify hybrid payment instrument (e.g., as selected by user 101), and may obtain, from payment instrument data 206, an account number, expiration data, and/or CSC assigned to the hybrid payment instrument. Payment module 202 may perform operations package the obtained portions of identification data 204A and payment instrument data 204B (e.g., the account number, expiration date, and CSC assigned to the hybrid payment instrument) into payment data 208, which client device 102 may transmit across communications channel 120A to POS terminal 122 using any of the short-range communications protocols outlined above.

In some aspects, a transaction initiation module 210 of POS terminal 122 may receive payment data 208 from client device 102, and further, may receive transaction data 209 from the merchant computing system, e.g., the cash register operated by merchant 121. In some aspects, transaction data 209 may include data characterizing the initiated transaction, which includes, but is not limited to, an identifier of the product or products involved in the transaction (e.g., user 101's lunch) and the corresponding transaction amount (e.g., $15.00). Transaction initiation module 210 may also access data repository 126 of POS terminal 122, and extract POS cryptogram 211 from terminal data 126A and a network address of acquirer system 130 from acquirer data 126C (e.g., the MAC address or the IP address). In some aspects, POS cryptogram 211 may uniquely identify POS terminal 122, and may be generated and assigned to POS terminal 122 by payment network system 140.

Transaction initiation module 212 may perform operations that package payment data 208, transaction data 209, and POS cryptogram 211 into an authorization request 212, which may be input to a routing module 214 of POS terminal 122. In some aspects, routing module 214 may transmit authorization request 214 across network 120B to the extracted network address of acquirer system 130, e.g., through communications unit 112C using any of the communications protocols outlined above.

As illustrated in FIG. 2, a relay module 216 of acquirer system 130 may receive authorization request 214 from POS terminal 122, and may parse authorization request 214 to extract POS cryptogram 211. Relay module 216 may verify an identity of POS terminal 122 and a validity of authorization request 214 based on extracted POS cryptogram 211 and POS terminal data 132, and in response to a successful verification, relay module 216 may access payment network data 134 and extract a network address of payment network system 140 (e.g., a MAC address or an IP address). In certain aspects, relay module 216 may transmit authorization request 214 across network 120B to the extracted network address of payment network system 140, e.g., using any of the communications protocols described above.

A relay module 218 of payment network system 140 may receive authentication request 214 from acquirer system 130, which received and relayed authentication request 214 from POS terminal 122. In one aspect, relay module 218 may parse authorization request 214 to extract POS cryptogram 211, and may verify an identity of acquirer system 130, and a validity of authorization request 214, based on extracted POS cryptogram 211 and acquirer data 144. In response to a successful verification, relay module 218 may access issuer data 146 and extract a network address of an issuer system associated with the selected payment instrument (e.g., a MAC address or IP address of issuer system 160, which issued the hybrid payment instrument identified within authorization request 214). Relay module 218 may transmit authorization request 214 across network 120B to the extracted network address of issuer system 160, e.g., using any of the communications protocols described above.

Further, as illustrated in FIG. 2, a verification module 220 of issuer system 160 may receive authorization request 214, and may perform operations that verify the selected payment instrument, e.g., the hybrid payment instrument described above, represents an authentic payment instrument issued by the financial institution that operates issuer system 160. For example, verification module 220 may parse authorization request 214 to extract account data identifying the selected payment instrument, e.g., the account number, expiration date, and/or CSC assigned to the hybrid payment instrument, may access hybrid account data 162A and obtain corresponding stored account data specifying the hybrid payment instrument, and may compare the extracted account data with the stored account data to verify the authenticity of the selected hybrid payment instrument. Further, although not depicted in FIG. 2, verification module 220 may also parse authorization request 214 to extract POS cryptogram 211, and may verify an identity of payment network system 140, and a validity of authorization request 214, based on extracted POS cryptogram 211 and additional stored data that identifies payment network system 140.

In one aspect, in response to an unsuccessful verification of the selected payment instrument, or an unsuccessful verification of authentication request 214 and/or payment network system 140, verification module 220 may generate data confirming the failed verification (not depicted in FIG. 2), and may transmit the generated confirmation data to payment network system 140 across network 1206 using any of the communication protocols described above. Relay module 218 of payment network system 160 may receive and route the confirmation data to acquirer system 130 across network 120B, and further, relay module 216 of acquirer system 130 may receive and route the confirmation data across network 120B to communications unit 127C of POS terminal 122, e.g., using any of the communications protocols described herein. In some aspects, not illustrated in FIG. 2, POS terminal 122 may process the confirmation data and present, within the GUI displayed on display unit 127A, additional interface elements that provide a graphical representation of the failed authorization to user 101.

Alternatively, in response to a successful verification of the selected payment instrument, and additionally or alternatively, a successful verification of authentication request 214 and payment network system 140, verification module 220 may generate verified authorization data 222, which includes the transaction data and the verified account data (e.g., an account number, expiration data, and/or CSC of the hybrid payment instrument), and which may be provided as input to SV authorization module 172. As described above, the selected payment instrument, e.g., the hybrid payment instrument, may incorporate a stored-value account (e.g., an "SV" account) issued by the financial institution that operates issuer system 160 and an underlying financial services account (e.g., a "linked" account) issued by the financial institution and flexibly and selectively linked to the stored-value account by user 101 using any of the processes described herein. In some aspects, described in reference to FIGS. 3 and 4A-4C, SV authorization module 172 may perform operations that authorize a portion of the initiated transaction (e.g., a portion of the $15.00 transaction amount of the initiated transaction for user 101's lunch) based an available balance of funds previously allocated to the SV account and based on one or more restrictions imposed on the SV account by user 101 and/or issuer system 160.

Figure 3:
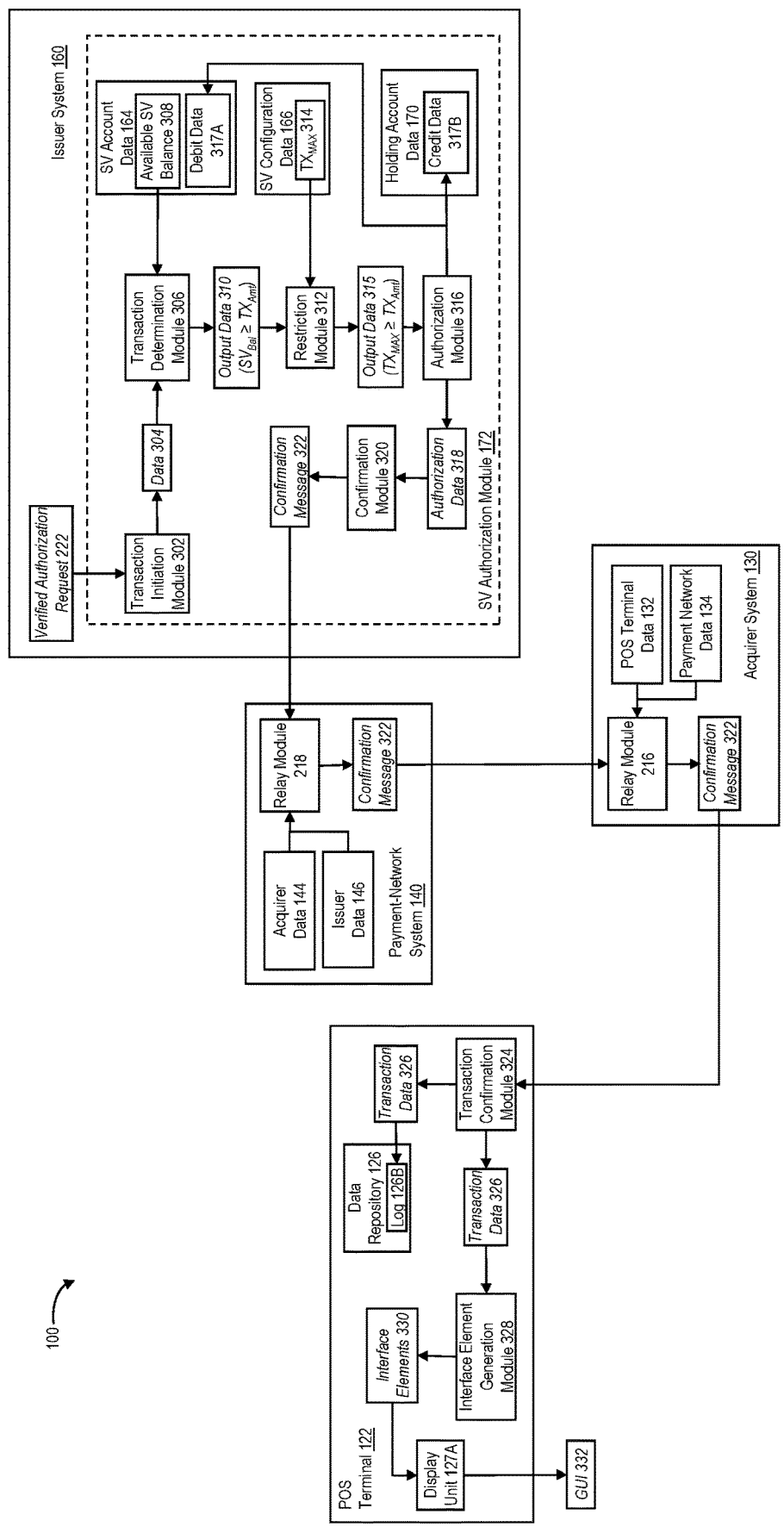

Referring to FIG. 3, SV authorization module 172 may receive verified authorization request 222, and a transaction initiation module 302 of SV authorization module 172 may process verified authorization request 222 and extract data 304 that identifies the transaction amount of the initiated transaction (e.g., $15.00) and the hybrid payment instrument (e.g., an account number, etc.). In some aspects, transaction initiation module 302 may provide data 304 as an input to a transaction determination module 306 of SV authorization module 172, which may process data 304 to determine whether the identified transaction amount (e.g., $15.00) exceeds an available balance of funds previously allocated to the SV account of the hybrid payment instrument.

Transaction determination module 306 may, for instance, parse data 304 to extract the transaction amount of the initiated transaction (e.g., "$TX_{AMT}$") and the account identifier of the hybrid payment instrument. Transaction determination module 306 may also access locally stored data that characterizes the SV account associated with the hybrid payment instrument, e.g., SV account data 164 maintained by issuer system 160 within the one or more tangible, non-transitory memories. Based on the account identifier of the hybrid payment instrument, transaction determination module 306 may access a portion of SV account data 164, e.g., data 308, that specifies an available balance of funds (e.g., "$SV_{BAL}$") previously allocated to the SV account associated with the hybrid payment instrument.

In some aspects, transaction determination module 306 may compare the available balance of the funds allocated to the SV account against the transaction amount associated with the initiated transaction to establish whether the SV account is capable of funding the entire transaction amount of the initiated transaction. For example, and as described above, the transaction may correspond to a value of $15.00, and based on data 308, transaction determination module 306 may establish that the current balance of funds allocated to the SV account is $35.00. Based on these values, transaction determination module 306 may determine that the available balance of $35.00 exceeds the transaction amount of $15.00 (e.g., that "$SV_{BAL} \geq TX_{AMT}$") and accordingly, that the SV account associated with the payment instrument is capable of funding the entire transaction amount. In certain aspects, transaction determination module 306 may generate output data 310 indicative of the determination, and may provide output data 310 to a restriction module 312 of SV authorization module 172, which may establish whether any restrictions imposed on the hybrid payment instrument (e.g., by user 101 or by issuer system 160, as described above) would limit the capability of the SV account to fund all or a portion of transaction amount of the initiated transaction.

For example, as described herein, user 101 (and additionally or alternatively, issuer system 160) may establish restrictions that specify a maximum portion of an initiated transaction fundable by the SV account (e.g., a maximum percentage of the transaction amount, such as 75%, or a maximum value, such as $50.00). In other instances, the established restrictions may include, but are not limited to, temporal or geographic restrictions (e.g., that the SV account funds purchase transactions initiated during specified time period or specified geographic locations) and restrictions based on transaction context (e.g., that the SV account funds initiated transactions involving specific goods, services, and/or merchants). The disclosed embodiments are not limited to these exemplary restrictions, and in further aspects, SV configuration data 166 may identify any additional or alternate funding restriction appropriate to the hybrid payment instrument, the underlying SV and linked accounts, and the initiated transaction.

Referring back to FIG. 3, restriction module 312 may access SV configuration data 166, e.g., as maintained in the one or more tangible, non-transitory memories of issuer system 160, and may obtain data 314 that identifies the restrictions imposed on the capability of the SV account to fund portions of the initiated transaction. For instance, and based on data 314, restriction module 312 may determine that user 101 or issuer system 160 established a threshold funding amount of $50.00 on the SV account (e.g., "$TX_{MAX}=\$50.00$"), and required that any portion of the transaction amount exceeding the imposed threshold funding amount be funded through the linked account associated with the hybrid payment instrument.

In certain aspects, as the current balance of funds allocated to the SV account exceeds the $15.00 transaction amount associated with the initiated transaction, restriction module 312 may determine that the SV account is capable of funding the entire transaction amount of $15.00, and may compare the transaction amount of the initiated transaction (e.g., $TX_{AMT}$) against the imposed threshold funding amount (e.g., $TX_{MAX}$). For example, as illustrated in FIG. 3, restriction module 312 may determine that the threshold funding amount of $50.00 exceeds the transaction amount of $15.00 fundable through the SV account (e.g., "$TX_{MAX} \geq TX_{AMT}$") and accordingly, that the imposed restrictions are inapplicable to initiated transaction. In certain aspects, restriction module 312 may generate output data 315 indicative of the determination, and may provide output data 315 to an authorization module 316, which may perform operations that authorize the initiated transaction using the available balance of funds allocated the SV account.

For example, authorization module 316 may generate and store data 317A within SV account data 164 that confirms a debit of the transaction amount (e.g., $15.00) from the available balance of funds allocated to the SV account (e.g., establishing a remaining balance of $20.00), and further, may generate and store data 3176 within holding account data 170 that confirm a credit of the transaction amount (e.g., $15.00) to acquirer system 160. Authorization module 316 may also generate unique, alphanumeric character representative of the authorized transaction, e.g., a unique authorization code, which authorization module 316 may associate and store with data 317A and 317B in corresponding ones of SV account data 164 and holding account data 170.

Authorization module 316 may also generate authorization data 318 that includes the generated authorization code and additional data, e.g., transaction data, that characterizes the authorized purchase transaction (such as the authorized transaction amount, account data identifying the hybrid payment instrument, etc.). Additionally or alternatively, authorization module 316 may also incorporate, within authorization data 138, data that identifies a current balance of the funds allocated to the SV account, e.g., the remaining balance of $20.00. In some aspects, authorization module 316 may provide authorization data 318 to a confirmation module 320 of SV authorization module 172, and confirmation module 320 may package portions of authorization data 318 into a confirmation message 322, which issuer system 160 may transmit across network 120B to payment network system 16 using any of the communications protocols described above.

In some aspects, relay module 218 of payment network system 140 may receive confirmation message 322 from issuer system 160, and may perform any of the processes described above to route confirmation message 322 to acquirer system 130 across network 120B. Further, although not illustrated in FIG. 3, payment network system 160 may parse confirmation message 322, extract the authorization code and the transaction data that characterizes the authorized transaction (e.g., the authorized transaction amount, the account data identifying the hybrid payment instrument, and the parties to the authorized transaction, e.g., the financial institution associated with issuer system 160 and the merchant associated with acquirer system 130), and store the extracted authorization code transaction data within the one or more tangible, non-transitory memories for clearance and settlement, as described below.

Further, relay module 216 of acquirer system 130 may receive confirmation message 322 from payment network system 140, may perform any of the processes described above to route confirmation message 322 to acquirer system 130 across network 120B. In some aspects, not illustrated in FIG. 3, acquirer system 130 may also parse confirmation message 322, extract the authorization code and the transaction data that characterizes the authorized transaction, and store the extracted authorization code and the transaction data within the one or more tangible, non-transitory memories.

POS terminal 122 may receive confirmation message 322 through communications unit 127C, and a transaction confirmation module 324 may perform operations that extract transaction data 326 from confirmation message 322. In some aspects, transaction data 326 may include the authorization code and additional data that characterizes the authorized transaction (e.g., the authorized transaction amount, the account data identifying the hybrid payment instrument, etc.), which POS terminal 122 store within one or more data records of transaction log 126B, along with additional or alternate transaction parameters, such as, but not limited to, a transaction time and date or a transaction location.

Transaction confirmation module 324 may also provide transaction data 326 to an interface element generation module 328, which may process transaction data 326 to generate one or more interface elements 330. In some aspects, interface element generation module 328 may provide generated interface elements 330 to display unit 127A, which may present interface elements 330 within a graphical user interface (GUI) 332 that identifies the authorization code and confirms the authorization of the initiated transaction. Further, in certain aspects, GUI 332 may also present interface elements that identify and confirm the available balance of the funds allocated to the SV account, e.g., the remaining balance of $20.00.

Additionally, although not depicted in FIG. 3, POS terminal 322 may provide data confirming the authorized purchase transaction to client device 102 across communications channel 120A, and client device 102 may perform operations that present a graphical confirmation of the authorized purchase transaction, and additionally or alternatively, the current balance of funds available and allocated to the SV account (e.g., the remaining balance of $20.00), through a graphical user interface (GUI) interface displayed on display unit 112A. In additional aspects, client device 10 may also present and audible or tactile conformation of the authorized purchase transaction to user 101 through a corresponding interface device.

In certain embodiments, described above, SV authorization module 172 may perform operations that determine a current balance of funds allocated the SV account associated with the hybrid payment instrument (e.g., $35.00) exceeds a transaction amount associated with an initiated transaction (e.g., $15.00), and further, that funding the initiated transaction on the basis of funds allocated to the SV account would be consistent with one or more restrictions established by user 101 and/or issuer system 160. In response to the determination, SV authorization module 172 may perform operations that: authorize the initiated transaction based on the funds allocated to the SV account; generate an authorization code confirming the authorized purchase transaction; and debit $15.00 transaction amount from the current balance of the allocated funds and credit the $15.00 transaction amount to a holding account maintained by issuer system 160 for clearance and settlement by payment network system 140.

In other aspects, SV authorization module 172 may determine that the current balance of funds allocated to the SV account is alone incapable of funding the entire transaction amount of the initiated transaction, or alternatively, that the restrictions imposed on the SV account by user 101 or issuer system 160 limit an ability of the SV account to fund all or a portion of the transaction amount. In response to such a determination, SV authorization module 172 may perform operations that identify a first portion of the transaction amount that is capable of being funded by the available balance of funds allocated to the SV account and consistent with the imposed restrictions. By way of example, the first portion of the transaction amount may correspond to a non-zero amount (e.g., indicating that at least a portion of the transaction amount is fundable by the SV account and consistent with the specified restrictions), or alternatively, the first portion may correspond to a zero value (e.g., indicating that no portion of the transaction amount is fundable by the SV account or consistent with the specified restrictions).

SV authorization module 172 may identify a second portion of the transaction amount that remains unfunded by the SV account, and provide data specifying the second, unfunded portion of the transaction amount through API 174 to LA authorization module 176, which may perform operations to fund the second portion of the transaction amount using the financial services account linked to the SV account (e.g., the linked account). In response to a successful authorization of the second, unfunded portion of the transaction amount based on the linked account, SV authentication module 172 may complete the authorization of the first portion of the transaction amount based on the current balance of funds allocated to the SV account, and generate and transmit confirmation of the authorized transaction, e.g., based on both the SV account and the linked account, to POS terminal 122, as described below in reference to FIGS. 4A and 4B.

For example, and subsequent of the authorized purchase of the $15.00 lunch, which reduced the current balance of funds allocated to the SV account of the hybrid payment instrument from $35.00 to $20.00, user 101 may visit a local grocery store (e.g., a local Whole Foods Market™) and select a variety of groceries for a party scheduled for the coming weekend. After check-out, a POS terminal maintained by the local grocery store, e.g., POS terminal 122, presents a graphical user interface (GUI) to user 101 (e.g., on display unit 127A) that identifies a transaction amount of $32.50 for the initiated transaction, and that prompts user 101 to present a payment instrument capable of funding the $32.50 transaction amount of the initiated transaction.

For example, as described above, user 101 may hold an open-loop, hybrid payment-instrument, which incorporates a stored-value account issued by a financial institution (e.g., the financial institution that operates issuer system 160) and an underlying financial services account that is issued by the financial institution and flexibly and selectively linked to the stored-value account (e.g., a linked account). As described below, the linked account may represent a secondary funding mechanism when the SV account is deemed incapable of funding an entire transaction amount of an initiated transaction (e.g., when the transaction amount exceeds a current balance of funds allocated to the SV account, or alternatively, when a portion of the transaction amount fundable by the SV account is inconsistent with one or more restrictions specified by user 101 and/or issuer system 160).

In certain aspects, and to provide payment for the initiated transaction, user 101 may dispose client device 102 proximate to POS terminal 122, and interface module 114 of client device 102 may establish communications channel 120A with POS terminal 122. As described above, client device 102 may transmit payment data that identifies the hybrid payment instrument (e.g., an account number, expiration data, CSC, etc.) across communications channel 120A to POS terminal 122, which may package portions of the received payment data (e.g., the account data identifying the hybrid payment instrument), transaction data characterizing the initiated transaction (e.g., the transaction amount of $32.50 and/or identifiers of the selected groceries), and a POS cryptogram that uniquely identifies POS terminal 122 into an authorization request, which POS terminal 122 may transmit across network 120B to acquirer system 130 in accordance with any of the communication protocols described herein.

In some embodiments, as the account data identifying the hybrid payment instrument masks the underlying accounts that fund purchase transactions involving the hybrid payment instrument (e.g., the SV account and the linked DDA), client device 102 and/or POS terminal 122 may transmit the account data across communications channel 120A or network 120B without a prior tokenization or encryption of the account data. Due to the lack of prior tokenization of encryption, functionalities of client device 102 and POS terminal 122 may, in some instances, be implemented by mobile and wearable devices characterized by reduced-functionality processing and storage technologies.

As described above, relay module 216 of acquirer system 130 may receive the transmitted authorization request, verify and validate portions of the authorization request using any of the processes described above, and transmit the verified and validated authorization request across network 120B to payment network system 140 in accordance with any of the communications protocols described herein. Relay module 218 of payment network system 140 may receive the authorization request transmitted from acquirer system 130, and may verify and validate portions of the authorization request in accordance with any of the exemplary processes described above. Relay module 218 may transmit the verified and validated authorization request across network 120B to issuer system 160, e.g., using any of the communications protocols described above.

In certain aspects verification module 220 of issuer system 160 may receive the authorization request, e.g., as transmitted by the payment network system across network 120B, and may perform any of the exemplary processes described above to verify that the selected payment instrument, e.g., the hybrid payment instrument, represents an authentic payment instrument issued by the financial institution that operates issuer system 160. Further, in some aspects, verification module 220 may also parse the received authorization request to extract the POS (e.g., POS cryptogram 211, described above) and may verify an identity of payment network system 160, and a validity of the authorization request, based on extracted the POS cryptogram and additional stored data that identifies payment network system 140.

In response to a successful verification of the hybrid payment instrument, and additionally or alternatively, a successful verification of the authentication request and payment network system 140, verification module 220 may generate a verified authorization request using any the exemplary processes described above. The verified authentication request may, in some instances, include the transaction data and the verified account data (e.g., an account number, expiration data, and/or CSC of the hybrid payment instrument), and which may be provided as input to stored-value (SV) authorization module 172. As described below in reference to FIGS. 4A and 4B, SV authorization module 172 may perform operations that authorize a first portion of the transaction amount of initiated transaction (e.g., a portion of the $32.50 transaction amount) based an available balance of funds previously allocated to the SV account and based on one or more restrictions imposed on the SV account by user 101 and/or issuer system 160 and further, may transmit data requesting an authorization of a second portion of the transaction amount using the linked account to LA authorization module 176 through funding API 174.

Figure 4A:
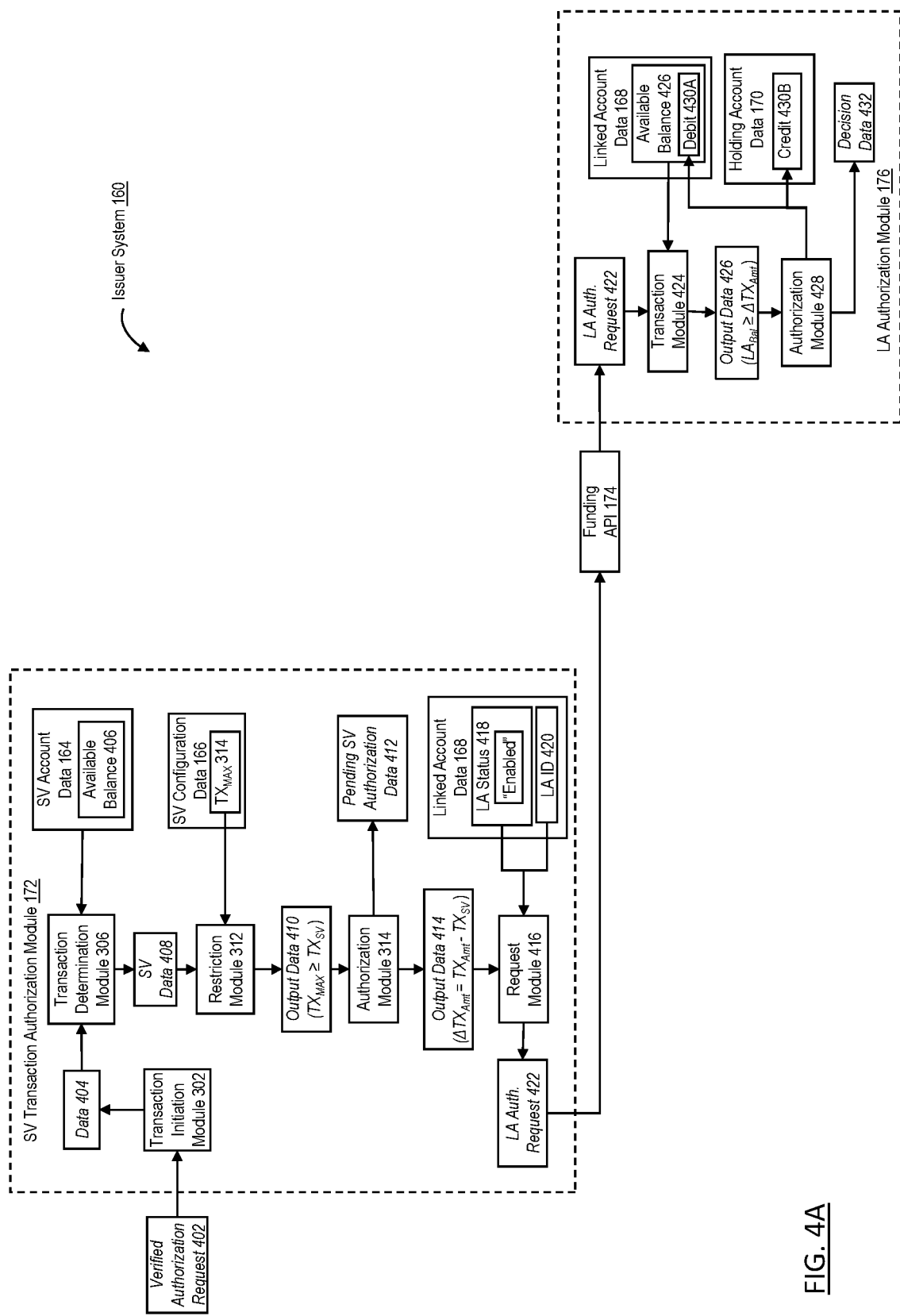

Referring to FIG. 4A, SV authorization module 172 may receive the verified authorization request, e.g., verified authorization request 402, and transaction initiation module 302 of SV authorization module 172 may process verified authorization request 402 and extract data 404 that identifies the transaction amount of the initiated transaction (e.g., $32.50) and an identifier of the hybrid payment instrument (e.g., an account number, etc.). In some aspects, transaction initiation module 302 may provide data 404 as an input to transaction determination module 306 of SV authorization module 172, which may process data 404 to determine whether the identified transaction amount (e.g., $32.50) exceeds an available balance of funds previously allocated to the SV account associated with the hybrid payment instrument.

Transaction determination module 306 may, for instance, parse data 404 to extract the transaction amount (e.g., "$TX_{AMT}$") and the account identifier of the hybrid payment instrument and based on the account identifier of the hybrid payment instrument, transaction determination module 306 may access a portion of locally stored SV account data 164, e.g., data 406, that specifies an available balance of funds (e.g., "$SV_{BAL}$") currently allocated to the SV account associated with the hybrid payment instrument (e.g., a current available balance of $20.00). In some aspects, transaction determination module 306 may compare the available balance of the funds allocated to the SV account against the transaction amount of the initiated transaction to establish whether the SV account is capable of funding the entire transaction amount.

For example, and as described above, the transaction may correspond to a value of $32.50, and based on data 406, transaction determination module 306 may establish that the current balance of funds allocated to the SV account corresponds to value of $20.00. Based on these values, transaction determination module 306 may determine that the transaction amount of $32.50 exceeds the available funds balance of $20.00, and accordingly, that the SV account associated with the payment instrument is incapable of funding the entire transaction amount of the initiated transaction.

In certain aspects, and in response to this determination, transaction determination module 306 may establish that the current balance of funds allocated to the SV account is capable of funding a first portion of the transaction amount (e.g., a $20.00 portion of the transaction amount, which is equivalent to the current available balance), and may generate SV data 408 that identifies the first portion of the transaction amount, which may be funded by the current balance of the allocated funds. Transaction determination module 306 may, in some instances, provide SV data 408 as an input to restriction module 312 of SV authorization module 172.

In one aspect, restriction module 312 may perform operations that establish whether any restrictions imposed on the hybrid payment instrument (e.g., by user 101 or by issuer system 160, as described above) would limit the capability of the SV account to fund the established first portion of transaction amount (e.g., the $20.00 portion of the transaction amount). For example, restriction module 312 may access SV configuration data 166, and may obtain data 314 that identifies the restrictions imposed on the capability of the SV account to fund portions of the initiated transaction. For instance, and based on data 314, restriction module 312 may determine that user 101 or issuer system 160 established a threshold funding amount of $50.00 on the SV account (e.g., "$TX_{MAX}=\$50.00$"), and required that any portion of the transaction amount exceeding the threshold funding amount be funded through the linked account associated with the hybrid payment instrument.

Restriction module 312 may, in some instances, compare the first portion of the transaction amount fundable by the current balance of funds allocated to the SV account (e.g., "$TX_{SV}$") against the threshold funding amount specified within the imposed funding restriction (e.g., $TX_{MAX}$). For example, as illustrated in FIG. 4A, restriction module 312 may determine that the threshold funding amount of $50.00 exceeds the $20.00 first portion of the transaction amount fundable through the SV account (e.g., "$TX_{MAX} \geq TX_{SV}$") and accordingly, that the imposed restrictions are inapplicable to initiated transaction.

In certain aspects, restriction module 312 may generate output data 410 indicative of the determination, and may provide output data 410 to an authorization module 316. Authorization module 316 may, in certain instances, generate data, e.g., pending SV authorization data 412, that identifies the first portion of the initiated transaction fundable based on the current balance of funds allocated the SV account (e.g., the first portions of $20.00), and store pending SV authorization data 412 within the one or more tangible, non-transitory memories maintained by issuer system 160. The generated and stored pending authorization data may, in some aspects, establish a hold over the $20.00 currently balance of funds allocated to the SV account, and would block the funding of other initiated transactions until a completion of the pending authorization process.

In an embodiment, authorization module 316 may also perform operations that identify a second portion of the transaction amount incapable of being funding by the SV account, and may initiate processes that fund the second portion of the transaction amount using the linked account associated the hybrid payment instrument (e.g., user 101's DDA). As described below, upon successful funding of the remaining, second portion of the initiated transaction using the linked account, authorization module 316 may perform operation that access pending SV authorization data 412, debit the first portion of the transaction amount (e.g., $20.00) from the available balance of funds allocated to the SV account (e.g., establishing a remaining balance of $0.00), and credit the first portion of the transaction amount (e.g., $20.00) to acquirer system 160, and confirm the final authorization of the initiated purchased transaction involving the hybrid payment instrument based on a cascading funding of the first portion through the SV account and a second portion through the linked account.

Referring back to FIG. 4A, authorization module 316 may perform operations that identify the second portion of the initiated transaction incapable of being funding by the SV account. In some instances, authorization module 316 may compute the second portion (e.g., "$\Delta TX_{Amt}$") as a difference between the transaction amount of the initiated transaction (e.g., "$TX_{Amt}$") and the first portion of the transaction amount fundable by the SV account (e.g., "$TX_{SV}$"). For example, authorization module 316 may establish that the remaining, second portion of the transaction account corresponds to $12.50 (e.g., $32.50-$12.50), and may output data 414 that specifies the computed second portion of the transaction amount (e.g., "$\Delta TX_{Amt}=TX_{Amt}-TX_{SV}$") and requests funding of the computed second portion by the linked account (e.g., the DDA of user 101).

In some aspects, a request module 416 of SV authorization module 172 may receive output data 414 (e.g., identifying the second portion of $12.50), and may access linked account data 168 to identify the linked account associated with the hybrid payment instrument (and the SV account), and to determine an availability of that linked account to fund the second portion of the initiated transaction. For example, and as described above, user 101 may provide, to client device 102 during an initial or subsequent configuration process, configuration data associating the linked account with the hybrid payment instrument (e.g., an account number, expiration date, etc. of the linked account) further, establishing a "status" of that linked account. In certain instances, the established status of the linked account may include, but is not limited to, a "null" status (e.g., which indicated user 101 specified no valid linked account), an "enabled" status (e.g., which indicates an availability of the linked account to fund portions of initiated transactions involving the hybrid payment instrument) or a "disabled" status (e.g., which indicates an unavailability of the linked account to fund portions of initiated transactions involving the hybrid payment instrument).

Referring back to FIG. 4A, request module 416 may access data 418, which indicates a linked-account (LA) status of "enabled." In response to the enabled status of the linked account, request module 416 may further access data 420 and extract data that identifies the enabled linked account, such as, but not limited to, an account number of the linked account or a routing number associated with the linked account. Based on the determination that the linked account is enabled for funding of initiated transactions, request module 416 may package data identifying the second portion of the transaction amount (e.g., $12.50) and the data identifying the enabled linked account (e.g., the account number, etc.) into a linked-account (LA) authorization request 422, which SV authorization module 172 may provide to linked account (LA) authorization module 176 through a corresponding programmatic interface, e.g., funding API 174. In certain aspects, and as described below, LA authorization module 176 may perform operations that funding the outstanding second portion of the transaction amount (e.g., $12.50) using the linked account and generate a confirmation of the authorized funding, which LA authorization module 176 may return to SV authorization module 172 through funding API 174.

In some aspects, a transaction module 424 of LA authorization module 176 may receive LA authorization request 422 (e.g., through funding API 174), and may parse LA authorization request 422 to extract the requested transaction amount (e.g., the $12.50 outstanding second portion of the transaction amount) and the account identifier of the linked account (e.g., the account number or routing number of user 101's DDA). Transaction module 424 may also access locally stored data that characterized the linked account, e.g., linked account data 168 maintained by issuer system 160 within the one or more tangible, non-transitory memories. Based on the account identifier of the linked account, transaction module 424 may access a portion of linked account data 168, e.g., data 426, that specifies an available balance of funds (e.g., "$LA_{BAL}$") available for use in purchase transaction involving the linked account.

In some aspects, transaction module 424 may compare the available funds balance (e.g., "$LA_{BAL}$") and the requested transaction amount (e.g., "$\Delta TX_{Amt}$," representing the $12.50 outstanding second portion) to establish whether the linked account is capable of funding the outstanding second portion of the transaction amount of the initiated transaction. For example, and based on data 426, transaction module 424 may establish that the current available balance of the linked account corresponds to a value of $1,123.00, which transaction module 424 may determine exceeds the $12.50 outstanding second portion of the transaction amount of the initiated transaction. Transaction module 424 may, in some instances, generate output data 426 indicative of the determination (e.g., that "$LA_{BAL} \geq \Delta TX_{AMT}$"), and may provide output data 426 to a linked account authorization module 428, which may authorize the funding of the $12.50 outstanding second portions of the transaction amount using the linked account associated with the hybrid payment instrument.

For example, authorization module 428 may perform operations that debit the outstanding second portion of the transaction amount (e.g., $12.50) from the available balance of the linked account in real-time (e.g., by generating and storing debit data 430A within linked account data 168), and by crediting the outstanding second portion of the transaction amount to a holding account maintained by issuer 160 (e.g., by storing credit data 430B within holding account data 170). In some aspects, issuer system 160 may maintain the credited $12.50 within the holding account, and on behalf of acquirer system 160, until clearance and settlement by payment network system 140.

Authorization module 428 may also generate decision data 432, which confirms the funding of the outstanding second portion of the transaction amount of the initiated transaction using the linked account and includes a unique, alphanumeric character string (e.g., an authorization code) assigned to the now-funded transaction. In some aspects, LA authorization module 176 may return decision data 432 to SV authorization module 172 through funding API 174 using any of the processes described herein, as illustrated in FIG. 4B.

Figure 4B:
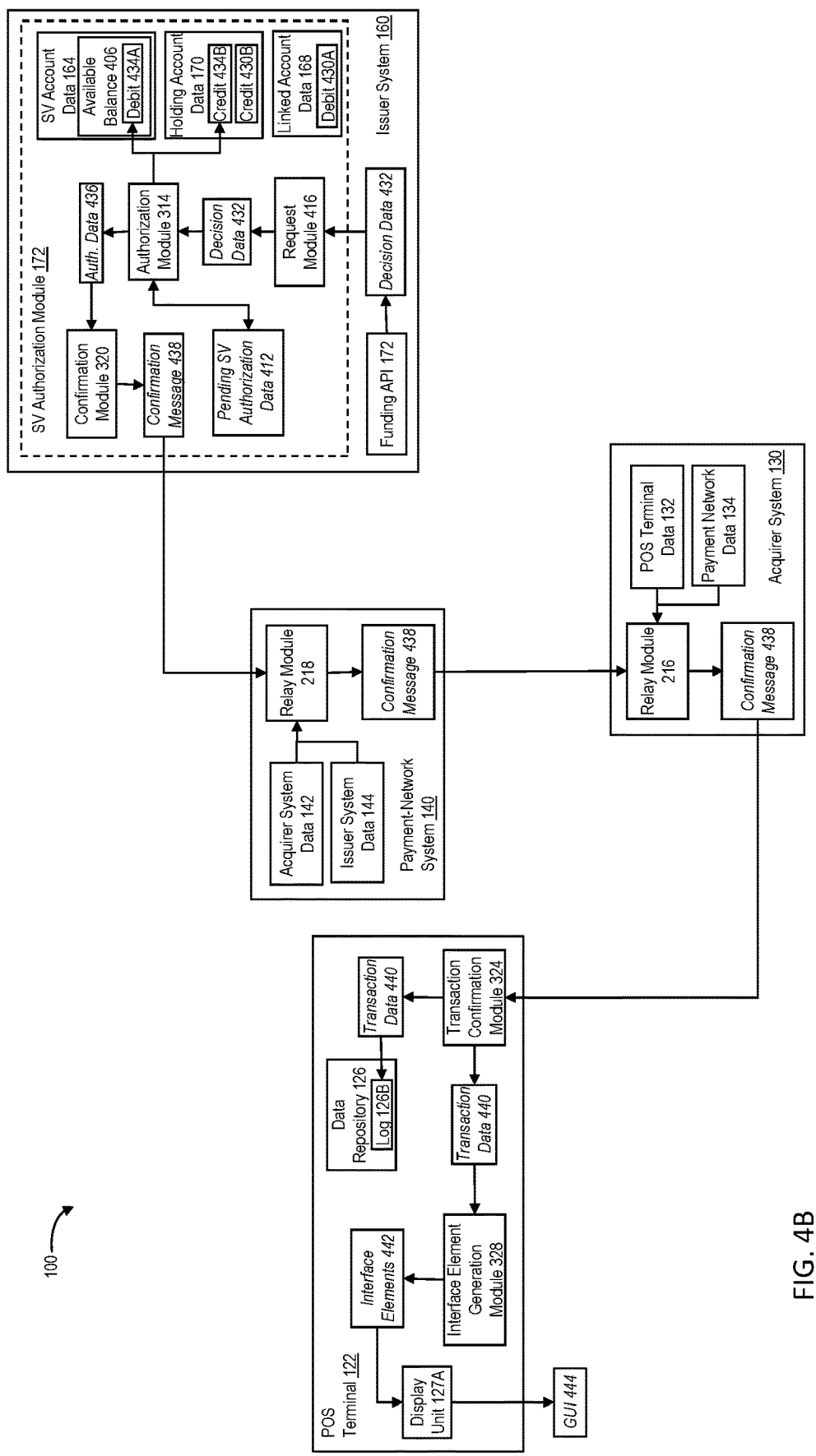

Referring to FIG. 4B, request module 416 may receive decision data 432 (e.g., from LA authentication module 176 through funding API 174), and may parse decision data 432 to determine that LA authentication module 176 performed operations that successfully funded the second outstanding portion of the transaction amount of the initiated transaction (e.g., the $12.50 outstanding portion). For example, funding request module 416 may perform operations that extract, from decision data 432, the authorization code associated with the transaction and transaction data characterizing the authorized transaction (e.g., the authorized transaction amount of $12.50, account data identifying the linked account, etc.), and may determine that decision data 432 reflects a successful authorization of the $12.50 outstanding second portion using the linked account.

Based on the identification of a successful authorization of the outstanding second portion of the transaction amount, request module 416 may route decision data 432 to authorization module 316, which may complete the pending funding of the first portion of the transaction amount (e.g., the $20.00 available balance allocated to the SV account) in accordance with pending SV authorization data 412 (e.g., as maintained within the one or more tangible, non-transitory memories). For example, and based on portions of pending SV authorization data 412, authorization module 316 may perform operations that debit of the $20.00 first portion of the transaction amount from the available balance of funds allocated to the SV account in real-time (e.g., by storing debit data 434A within a portion of SV account data 164) and that credit of the $20.00 first portion of the transaction amount to the holding account maintained by issuer 160 (e.g., by storing credit data 434B within holding account data 170, along with credit data 430B). In some aspects, issuer system 160 may maintain the credited $32.50 within the holding account (e.g., corresponding to both the credited first and second portions of the transaction amount), and on behalf of acquirer system 160, until clearance and settlement by payment network system 140. Further, authentication module 316 may no longer maintain pending SV authorization data 412 within the one or more tangible, non-transitory memories in view of the now-authorized transaction.

Authorization module 316 may also generate authorization data 436, which confirms the funding of the first portion of the transaction amount using the SV account and the outstanding second portion of the transaction amount using the linked account, and which includes a unique, alphanumeric character string (e.g., an authorization code) assigned to the now-funded transaction. By way of example, authorization data 436 may identify the separate transactions that fund the first and second portions of the transaction amount, the values of the first and second portions (e.g., $20.00 and $12.50, respectively), the accounts that funded the first and second portions (e.g., the SV and linked account, respectively), and a remaining balance of funds allocated to the SV account (e.g., $0.00, as reduced by the $20.00 first portion). In some aspects, authorization module 316 may provide authorization data 436 to confirmation module 320 of SV authorization module 172, and confirmation module 320 may package portions of authorization data 428 into a confirmation message 438, which issuer system 160 may transmit across network 120B to payment network system 140 using any of the communications protocols described above.

In some aspects, relay module 218 of payment network system 140 may receive confirmation message 438 from issuer system 160, and may perform any of the processes described above to route confirmation message 438 to acquirer system 130 across network 120B. Further, although not illustrated in FIG. 4, payment network system 160 may parse confirmation message 438, extract the authorization code and the transaction data that characterizes the authorized transaction (e.g., data characterizing the separate funding transactions of the first and second portions of the transaction amount), and store the extracted authorization code transaction data within the one or more tangible, non-transitory memories for clearance and settlement, as described below.

Further, relay module 216 of acquirer system 130 may receive confirmation message 438 from payment network system 140, may perform any of the processes described above to route confirmation message 438 to acquirer system 130 across network 120B. In some aspects, not illustrated in FIG. 4B, acquirer system 130 may also parse confirmation message 438, extract the authorization code and the transaction data that characterizes the authorized transaction, and store the extracted authorization code and the transaction data within the one or more tangible, non-transitory memories.

POS terminal 122 may receive confirmation message 438 through communications unit 127C, and a transaction confirmation module 324 may perform operations that extract transaction data 440 from confirmation message 438. In some aspects, transaction data 440 may include the authorization code and additional data that characterizes each of the separate transactions that fund the first and second portions of the transaction amount, such as the values of the first and second portions (e.g., $20.00 and $12.50, respectively), the accounts that funded the first and second portions (e.g., the SV and linked account, respectively), and a remaining balance of funds allocated to the SV account (e.g., $0.00, as reduced by the $20.00 first portion). POS terminal 122 can store portions of transaction data 440 within one or more data records of transaction log 126B, along with additional or alternate transaction parameters, such as, but not limited to, a transaction time and date or a transaction location.

Transaction confirmation module 324 may also provide transaction data 440 to an interface element generation module 328, which may process transaction data 326 to generate one or more interface elements 442. In some aspects, interface element generation module 328 may provide generated interface elements 442 to display unit 127A, which may present interface elements 442 within an graphical user interface (GUI) 444 that identifies the authorization code and confirms the authorization of the initiated transaction. Further, in certain aspects, GUI 444 may also present interface elements that identify and confirm the available balance of the funds allocated to the SV account, e.g., the remaining balance of $0.00.

Additionally, although not depicted in FIG. 3, POS terminal 122 may provide data confirming the authorized purchase transaction to client device 102 across communications channel 120A, and client device 102 may perform operations that present a graphical confirmation of the authorized purchase transaction, and additionally or alternatively, the current balance of funds available and allocated to the SV account (e.g., the remaining balance of $0.00), through a graphical user interface (GUI) interface displayed on display unit 112A. In additional aspects, client device 102 may also present and audible or tactile conformation of the authorized purchase transaction to user 101 through a corresponding interface device.

In certain embodiments, described above, request module 416 of SV authorization module 172 may receive output data 414 (e.g., which identifies the outstanding $12.50 second portion of the transaction amount), and may access linked account data 168 to identify a linked account associated with the hybrid payment instrument (and the SV account), and to determine an availability of that linked account to fund the outstanding second portion of the initiated transaction. As described above, request module 416 may determine, based on portions of linked account data 168, that status of the linked account corresponds to "enabled," which indicates the linked account is available to funds portions of the initiated transaction.

In other aspects, and consistent with the disclosed embodiments, request module 416 may determine, based on the accessed portion of linked account data 168, that the status parameter value of the linked account is "null" (e.g., indicating that no financial services account is linked to the SV account and the hybrid payment instrument) or alternatively, that the status of the linked account is "disabled" (e.g., indicating that the linked account is unavailable to fund portions of the initiated transactions). In response to a determination of the "null" or "disabled" linked-account status, funding request module 416 may establish that the linked account is unavailable to fund the outstanding second portion of the transaction amount, and SV authorization module 172 may perform operations that decline the initiated transaction (e.g., due to the unavailability of the linked account), delete previously stored pending SV authorization data 412, and generate a message that identifies the decision to decline the initiated transaction and includes a unique, alpha-numeric character string generated by SV authorization module 172 and confirming the declined purchase transaction.

Issuer system 160 may, in some instances, transmit the confirmation message across network 120B to payment network system 140, which may route the confirmation request to acquirer system 130 and to POS terminal 122 using any of the exemplary processes described above. Further, POS terminal 122 may perform any of the processes described herein to process the confirmation message and display, on display unit 112A, a graphical user interface that confirms the declined purchase transaction.

Further, and as described above, request module 416 may receive decision data 432 (e.g., from LA authentication module 176 through funding API 174), and may parse decision data 432 to determine that LA authentication module 176 performed operations that successfully funded the second outstanding portion of the transaction amount of the initiated transaction (e.g., the $12.50 outstanding portion). Based on the identification of a successful authorization of the outstanding second, funding request module 416 may route decision data 432 to authorization module 316, which may complete the pending funding of the first portion of the transaction amount (e.g., the $20.00 available balance allocated to the SV account) in accordance with pending SV authorization data 412.

In other aspects, however, LA authentication module 176 may be incapable of funding the second outstanding portion of the transaction amount using the linked account (e.g., due to an insufficiency in available funds, etc.), and decision data 432 may indicate, to request module 416, the failure of the authorization process. In certain aspects, and in response to the failed authorization process, SV authorization module 172 may perform operations that decline the initiated transaction (e.g., due to the unavailability of funding from the linked account), delete previously stored pending SV authorization data 412, and generate a confirmation message that identifies the decision to decline the initiated transaction. As described above, the generated confirmation message can also include a unique, alpha-numeric character string generated by SV authorization module 172 and can confirm the declined purchase transaction. Using any of the exemplary processes described above, issuer system 160 may transmit the generated confirmation message across network 120B to payment network system 160, which may cooperate with acquirer system 130 to relay the confirmation message to POS terminal 122. Further, POS terminal 122 may perform any of the processes described herein to process the confirmation message and display, on display unit 112A, a graphical user interface that confirms the declined purchase transaction.

Further, in certain embodiments, issuer system 160 performs operations that authorize purchase transactions involving an open-loop, hybrid payment-instrument, which incorporates a SV account issued by a financial institution associated with issuer system 160 and an underlying financial services account issued by that financial institution and flexibly and selectively linked to the SV account by user 101 (e.g., a linked account). Linked accounts consistent with the disclosed embodiments may include, but are not limited to, credit card accounts, debit card accounts, or demand deposit accounts held by the financial institution that operates issuer system 160. In some aspects, described above, one or more processors of issuer system 160 may execute SV authorization module 172 to selectively authorize portions of the initiated transactions using a current balance of funds allocated to the SV account and further, may execute LA authorization module 176 to selective authorize additional portions of the initiated transactions using the linked account issued by the financial institution. Further, and as described above, SV authorization module 172 and LA authorization module 174 exchange data programmatic across an application programming interface, e.g., funding API 174.

In an embodiment, issuer system 160 may include multiple discrete computing systems capable of communicating across network 120B and additionally or alternatively, across one or more internal or private communications networks (e.g., which collectively form an issuer "domain"), and SV authentication module 172 and LA authentication module 176 may be executed by different ones of these discrete computing systems within the issuer domain. These discrete computing systems within the issuer domain may perform any of the exemplary processes described above to authorize purchase transactions involving an open-loop, hybrid payment-instrument, either individually or cooperatively, and the discrete computing systems that execute SV authentication module 172 and LA authentication module 176, respectively, may exchange data and messages through funding API 176 and across network 120B (or any other internal or private network) using any of the exemplary communications protocols described herein.

Figure 5:
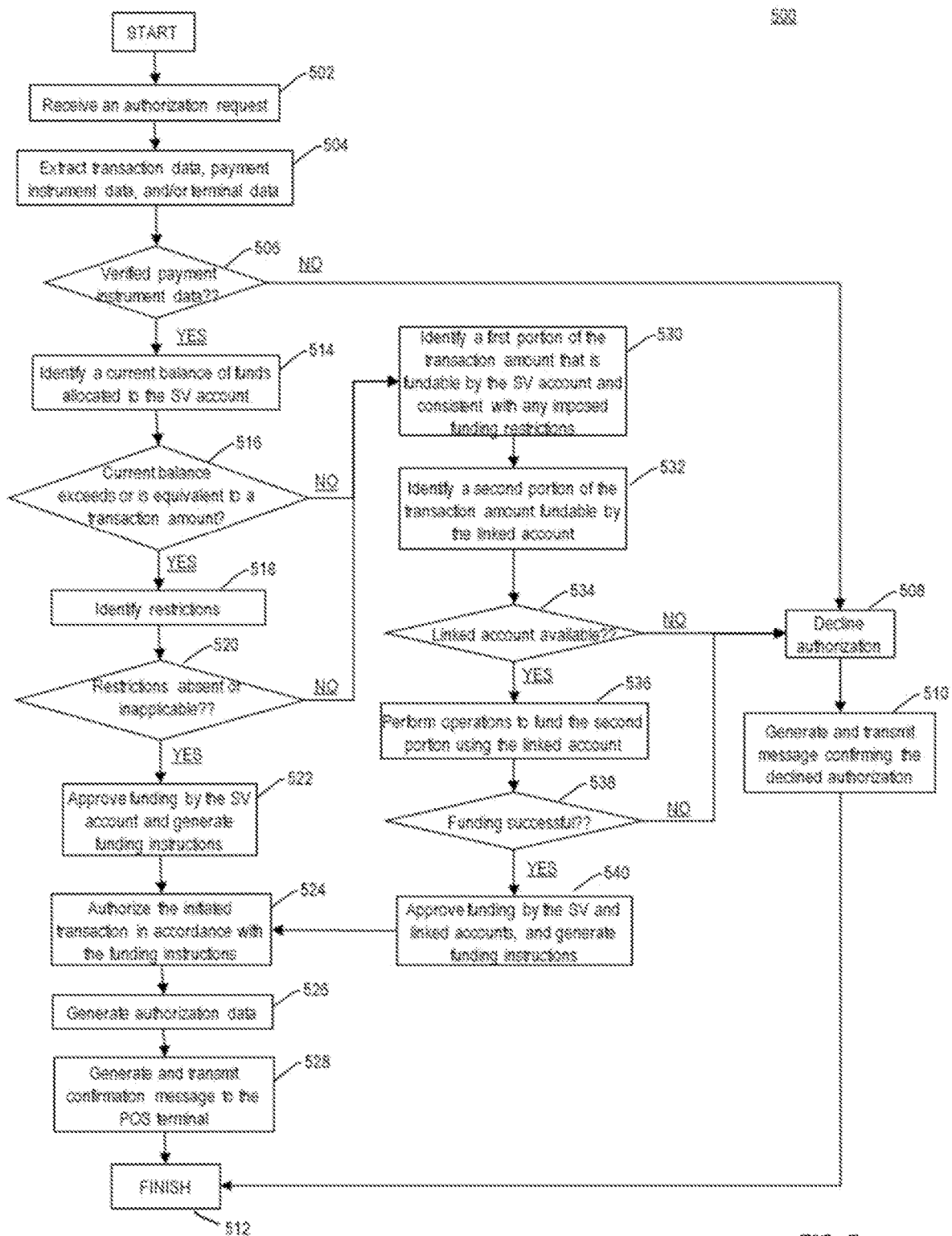
FIG. 5 is a flowchart of an exemplary process for approving an initiated data exchange in real-time based on flexibly allocated data-exchange parameters, in accordance with disclosed embodiments.

FIG. 5 is a flowchart of an exemplary process 500 for authorizing a performance of initiated data exchange based on flexibly allocated data-exchange parameters, in accordance with the disclosed embodiments. In certain aspects, and as described above, the initiated data exchange may facilitate a secure, real-time approval of a transaction initiated at a network-connected device, such as POS terminal 122 of FIG. 1. For example, the initiated transaction may correspond to a purchase transaction in which a customer, e.g., user 101 of FIG. 1, purchases a good or service from a merchant, e.g., merchant 121, at an agreed-upon price (e.g., a transaction amount). In certain instances, and as described above, POS terminal 122 may establish a direct channel of communications (e.g., communications channel 120A of FIG. 1) with a consumer payment device available to user 101 (e.g., client device 102 of FIG. 1), and may be configured to receive data identifying one or more payment instruments available for use in the initiated transaction across communications channel 120.

In certain aspects, the one or more payment instruments may include, but are not limited to, credit and debit card accounts (e.g., Visa™ credit card accounts, etc.) held by the customer and issued by one or more financial institutions, checking or savings accounts held by the customer at one or more financial institutions, open- or closed-loop stored-value accounts, electronic funds transfers (e.g., e-transfers), units of one or more digital currencies held by the customer in one or more corresponding accounts (e.g., units of Bitcoin™, Litecoin™, etc.), and other accounts held by or available to the customer and capable of funding the initiated transaction. In additional aspects, and as described above, the one or more payment instruments may also include an open-loop "hybrid" payment instrument, which may be issued by a financial institution, and which may be linked to multiple customer accounts capable of funding corresponding portions of the transaction amount of the initiated transaction. In some examples, a computing system operated by the issuing financial institution of the hybrid payment instrument, e.g., issuer system 160 of FIG. 1, may perform the steps of exemplary process 500.

By way of example, and without limitation, the hybrid payment instrument may be linked to a stored-value account (e.g., an "SV" account) issued by the financial institution that operates issuer system 160, and to an underlying financial services account (e.g., a "linked" account) issued by that financial institution and available to the customer. Linked accounts consistent with the disclosed embodiments may include, but are not limited to, credit card accounts, debit card accounts, or demand deposit accounts held by the financial institution that operates issuer system 160. In some instances, described below, issuer system 160 may perform the steps of exemplary process 500 to fund selectively portions of the transaction amount of the initiated transaction based on fund allocated to the SV account and/or available to the linked account, and based on the selective funding of the portions of the transaction amount, authorize the performance of the initiated data exchange and approve the initiated transaction securely and in real-time, as described below.

Referring to FIG. 5, issuer system 160 may receive data requesting an authorization of the transaction initiated at POS terminal 122 (e.g., in step 502). In certain aspects, POS terminal 122 may generate the request data based on transaction data received from a merchant computing system (e.g., a cash register), payment data received from client device 102, and cryptographic data that uniquely identifies POS terminal 122 (e.g., a POS cryptogram). The generated request data may be transmitted across a communications network, e.g., network 120B of FIG. 1, from POS terminal 122, to acquirer system 130, to payment network system 140, and to issuer system 160 using any of the exemplary processes described above.

The received request data may, for example, include transaction data characterizing the initiated transaction, such as a transaction amount, and account data that characterizes a payment instrument provided to POS terminal 122 by client device 102, e.g., an account number, expiration date, card-security code (CSC) or other data that uniquely identifies the hybrid payment instrument to issuer system 160. The received request data may also include terminal data, such as a POS cryptogram, that uniquely identifies POS terminal 122 to issuer system 160 and to other systems operating within environment 100, such as acquirer system 130 and payment network system 140. In certain aspects, issuer system 160 may process the received request data, extract portions of the transaction data, the payment data, and the terminal data, and stored the extracted portions within a tangible, non-transitory memory locally accessible to issuer system 160 (e.g., in step 504).

In some aspects, issuer system 160 may determine that the extracted account data, which identifies the hybrid payment instrument, corresponds to a portion of the obtained customer account data, and in response to the determination, verify that the hybrid payment instrument is an authentic payment instrument issued by the financial institution that operates issuer system 160 (e.g., also in step 504). Further, in step 504, issuer system 160 may also perform operations that verify an authenticity of the authorization request, e.g., based on cryptographic data incorporated into the authorization request that uniquely identifies POS terminal 122 and additionally or alternatively, acquirer system 130 and payment network system 140, which routed the authorization request from POS terminal 122 to issuer system 160.

Issuer system 160 may also perform operations that verify an authenticity of the payment instrument data extracted from the received request data (e.g., in step 506). For example, issuer system 160 may access locally stored data identifying one or more financial services accounts issued to customers of the financial institution that operates issuer system 160 (e.g., customer account data 162 of FIG. 1) and obtain account data (e.g., hybrid account data 162A of FIG. 1) that uniquely identifies the hybrid payment instrument, such as an account number, expiration date, or CSC. In certain aspects, issuer system 160 may compare the payment instrument data extracted from the received request data, which identifies the hybrid payment instrument, against the obtained account data, and based on an outcome of the comparison, perform operations that verify the authenticity of the payment instrument data. Further, in some aspects aspect, issuer system 160 may perform operations to verify the authenticity of POS terminal 122 (e.g., based on the POS cryptogram included within the extracted terminal data) and additionally or alternatively, an authenticity of acquirer system 130 and/or payment network system 140 (e.g., based on identifying data included within, and extracted from, the received request data).

If issuer system 160 were to determine that the extracted payment instrument data fails to match the obtained account data (e.g., step 506; NO), issuer system 160 may perform operations that decline to authorize or fund the initiated transaction (e.g., in step 508), and may generate a message confirming the declined authorization for transmission to POS terminal 122 using any of the exemplary processes described above (e.g., in step 510). Exemplary process 500 may then be complete in step 512.

Alternatively, if issuer system 160 were to determine that the extracted payment instrument data matches the obtained account data (e.g., step 506; YES), issuer system 160 may establish that the provided payment instrument data, which identifies the hybrid payment instrument, is authentic and valid. In certain aspects, issuer system may access locally stored data (e.g., SV account data 164 of FIG. 1) and identify a current balance of funds allocated to the SV account for use in purchase transactions (e.g., in step 514). Further, issuer system 160 may also perform operations that compare the current balance of the funds allocated to the SV account against the transaction amount that characterizes the initiated transaction (e.g., as included within the extracted transaction data), and based on an outcome of the comparison, determine whether the funds allocated to the SV account are alone sufficient to fund the transaction amount of the initiated transaction (e.g., in step 516).

If issuer system 160 were to determine that the current balance of funds allocated to the SV account exceeds or is equivalent to the transaction amount (e.g., step 516; YES), issuer system 160 may establish that the funds allocated to the SV account are sufficient to fund the transaction amount of the initiated transaction, and issuer system 160 may access locally stored data (e.g., SV configuration data 166 of FIG. 1) to identify any imposed restrictions on an ability of the SV account to fund all or a portion of the transaction amount of the initiated transaction (e.g., in step 518). In some instances, and as described herein, the restrictions may be imposed selectively by user 101 (e.g., through the exemplary configuration processes described herein), and additionally or alternatively, may be imposed programmatically by issuer system 160 based on certain account-related events, such as a velocity of initiated transactions, transaction amounts that exceed a specified ceiling, etc.

By way of example, and as described above, the restrictions may include, but are not limited to, a user-imposed restriction that establishes a threshold funding value for any transaction amount portion funded by the SV account of the hybrid payment instrument (e.g., a $50.00 maximum), and requires that any remaining portion of the transaction amount be funded through the linked account associated with the hybrid payment instrument. The disclosed embodiments are, however, not limited to this exemplary restriction, and in other aspects, user 101 or issuer system 160 may impose any additional or alternate funding restriction appropriate the hybrid payment instrument, the SV account, and the linked account, including an imposition of no restrictions on the capability of the SV account to fund initiated transactions.

Referring back to FIG. 5, issuer system 160 may determine whether user 101 or issuer system 160 imposed any restrictions on the SV account, and if so, determine whether any of the imposed restrictions are applicable to the ability of the SV account to fund all or a portion of the transaction amount of the initiated transaction (e.g., in step 520). For example, in step 520, issuer system 160 may establish an absence of any restrictions on the ability of the SV account to fund initiated transaction (e.g., neither user 101 nor issuer system 160 imposed any restrictions on the SV account). In other instances, as described above, issuer system 160 may identify a user-imposed restriction that establishes a threshold funding value for any transaction amount portion funded by the SV account, and may determine in step 520 whether that portion of the transaction amount fundable by the SV account (e.g., the entire transaction amount) is consistent with and less than the imposed maximum value.

If issuer system 160 were unable to identify restrictions imposed on the SV account, or alternatively, is issuer system 160 were to determine that the identified restrictions are inapplicable to the portion of the transaction amount fundable by the SV account (e.g., step 520; YES), issuer system 160 may approve the funding of the transaction amount of the initiated transaction solely based on the funds allocated to the SV account, and may generate funding instructions consistent with the approved funding source and amount (e.g., in step 522). In some aspects, the generated funding instructions may identify the funding source (e.g., the SV account), identify the approved funding amount (i.e., the entire transaction amount), and further, confirm the approved funding of the entire transaction amount by the SV account. Issuer system 160 may also perform operations that authorize the initiated transaction using the hybrid payment instrument and in accordance with generated funding instructions (e.g., in step 524).

In some aspects, in step 524, issuer system 160 may perform operations that debit the funded portions of the transaction amount (e.g., the entire transaction amount) from the available balance of funds allocated to the SV account in real-time (e.g., by generating and storing debit data within a portion of SV account data 164 of FIG. 1), and by crediting the funded portion of the transaction amount to a holding account maintained by issuer 160 on behalf of acquirer system 130 in real-time (e.g., by storing credit data within holding account data 170 of FIG. 1). In some aspects, issuer system 160 may maintain the credited funds within the holding account (e.g., on behalf of acquirer system 130) until clearance and settlement by payment network system 140. Issuer system 160 may also generate, in step 524, a unique, alphanumeric character string, such as a unique authorization code, representative of the authorized funding of the entire transaction amount by the SV account of the hybrid payment instrument, which issuer system 160 may associate and store with the debit and credit data in corresponding ones of SV account data 164 and holding account data 170.

Issuer system 160 may also generate authorization data that includes the generated authorization code and transaction data that characterizes the authorized transaction, such as the authorized transaction amount or account data identifying the hybrid payment instrument (e.g., in step 526). The generated authorization data may also identify a current balance of the funds allocated to the SV account, e.g., the remaining balance of allocated funds reduced by the transaction amount of the now-authorized purchase transaction. Issuer system 160 may, in some instances, may package portions of the authorization data into a confirmation message, which issuer system 160 may transmit across network 120B, through payment network system 140, to acquirer system 30, and finally to POS terminal 122, using any of the processes described herein (e.g., in step 528). Exemplary process 500 is then complete in step 512.

Referring back to step 516, if issuer system 160 were to determine that the transaction amount exceeds the current balance of funds allocated to the SV account (e.g., step 516; NO), issuer system 160 may establish that the funds allocated to the SV account are alone insufficient to fund the transaction amount of the initiated transaction, and issuer system 160 may perform any of the exemplary processes described herein to identify a first portion of the transaction amount that is fundable by the SV account and consistent with any restrictions imposed on the SV account by user 101 and/or issuer system 160 (e.g., in step 530). Issuer system 160 may also identify a second portion of the transaction amount that remains unfunded by the SV account (e.g., in step 532), and may perform any of the exemplary processes described herein to fund the second portion of the transaction amount using the linked account associated with the hybrid payment instrument.

For example, issuer system 160 may access locally stored data that identifies a status parameter value of the linked account (e.g., LA status data 418 within linked account data 168 of FIG. 4A), and may determine whether the linked account is currently available to fund the second portion of the transaction amount (e.g., in step 534). If, based on the accessed data, issuer system 160 were to establish that no financial services account is linked to the hybrid payment instrument (e.g., a status parameter value of "null"), or that the linked account is not available to fund initiated transactions involving the hybrid payment instrument (e.g., a status parameter value of "disabled"), issuer system 160 may determine that the linked account is unavailable to fund the second portion of the transaction amount (e.g., step 534; NO). Exemplary process 500 may pass back to step 508, and issuer system 160 may perform any of the processes described above to decline the initiated transaction and provide a message confirming the declined transaction to POS terminal 122.

Alternatively, if issuer system 160 were to establish that the linked account is available to fund initiated transactions involving the hybrid payment instrument (e.g., step 534; YES), issuer system 160 may perform any of the exemplary processes described above to fund the second portion of the transaction amount using the linked account (e.g., in step 536). For example, issuer system 160 may determine in step 534 that the linked account is associated with a status parameter value of "enabled," and as such, the linked account is available to fund the initiated transactions involving the hybrid payment instrument. In some instances, in step 536, issuer system 160 may access stored data (e.g., linked account data 168 of FIG. 1) to identify a balance of funds available to the linked account (e.g., a balance of a debit account, an amount of credit available to a credit card account, etc.), and may determine whether the available balance exceeds or is equivalent to the second portion of the transaction amount. Based on the determination, issuer system 160 may whether the linked account is capable of successfully funding the second portion of the transaction amount using the linked account (e.g., in step 538).

If, for example, issuer system 160 were to determine that the second portion of the transaction amount exceeds the balance of funds available to the linked account (and additionally or alternatively, that funding the second portion using the linked account violates restrictions or funding guidelines established by issuer system 160), issuer system may determine that the funding process was unsuccessful (e.g., step 538; NO). In certain aspects, exemplary process 500 may pass back to step 508, and issuer system 160 may perform any of the processes described above to decline the initiated transaction and provide a message confirming the declined transaction to POS terminal 122.

Alternatively, if issuer system 160 were to determine that the balance of funds available to the linked account exceeds the second portion of the transaction amount (and that funding the second portion using the linked account is consistent with restrictions or funding guidelines established by issuer system 160), issuer system may determine that the funding process was successful (e.g., step 538; YES). In some aspects, issuer system 160 may approve (i) the funding of the first portion of the transaction about based on the current balance of funds available to the stored-value account and (ii) the funding of the second portion of the transaction amount using the linked account (e.g., in step 540). Further, in step 540, issuer system 160 may also generate funding instructions consistent with the approved funding sources and amounts. In some aspects, the generated funding instructions may identify the funding sources (e.g., the stored-value account and the linked account), identify the approved funding amount (i.e., the first and second portions), and further, confirm the approved collective funding of the transaction amount by the stored-value account and the linked account. Exemplary process 500 may pass back to step 524, and issuer system 160 may perform operations that authorize the initiated transaction using the hybrid payment instrument and in accordance with generated funding instructions.

In some aspects, in step 524, issuer system 160 may perform operations that: debit the first portion of the transaction amount from the available balance of funds allocated to the SV account in real-time (e.g., by generating and storing first debit data within a portion of SV account data 164 of FIG. 1); credit the first portion of the transaction amount to the holding account maintained by issuer 160 on behalf of acquirer system 130 in real-time (e.g., by storing first credit data within holding account data 170 of FIG. 1); debit the second portion of the transaction amount from the available balance the linked account in real-time (e.g., by generating and storing second debit data within a portion of linked account data 168 of FIG. 1); and credit the second portion of the transaction amount to the holding account maintained by issuer 160 on behalf of acquirer system 130 in real-time (e.g., by storing second credit data within holding account data 170 of FIG. 1). In some aspects, issuer system 160 may maintain the credited funds within the holding account until clearance and settlement by payment network system 140. Issuer system 160 may also generate, in step 524, a unique, alphanumeric character string e.g., a unique authorization code, representative of the authorized funding of the portions of the transaction amount by the SV account and the linked account of the hybrid payment instrument, which issuer system 160 may associate and store with the stored debit and credit data.

Issuer system 160 may also generate authorization data that includes the generated authorization code and transaction data that characterizes the authorized transaction using any of the processes described above (e.g., in step 528), and may package portions of the authorization data into a confirmation message, which issuer system 160 may transmit across network 120B, through payment network system 140, to acquirer system 30, and finally to POS terminal 122, using any of the processes described herein (e.g., in step 528). Exemplary process 500 is then complete in step 512.

III. Exemplary Computer-Implemented Processes for Selectively Configuring Open-Loop, Hybrid Payment Instrument In certain embodiments, as described herein, issuer system 160 performs operations to authorize purchase transactions initiated at a POS terminal, e.g., POS terminal 122, and involving an open-loop hybrid payment instrument that incorporates flexible and configurable funding accounts and funding components. For example, and as described above, hybrid payment instruments consistent with the disclosed embodiments may incorporate a stored-value account issued by a financial institution (e.g., the financial institution that operates issuer system 160) and an underlying financial services account issued by that financial institution and flexibly and selectively linked to the stored-value account by user 101 (e.g., a liked account). Linked accounts consistent with the disclosed embodiments may include, but are not limited to, credit card accounts, debit card accounts, or demand deposit accounts held by the financial institution that operates issuer system 160. In certain aspects, a customer of the financial institution that holds the issued hybrid payment instrument, e.g., user 101 that operates client device 102, may access a web page or other digital portal associated with the financial institution, and selectively and flexible configure the operation of the store-value and linked accounts that collectively establish the hybrid payment instrument.

By way of example, user 101 may provide input to client device 102 (e.g., via input unit 112A) that causes client device 102 to execute a web browser application, open a web page associated with the financial institution that operates issuer system 160 (e.g., and that issues the hybrid payment instrument), and present that web page to user 101 via display unit 112A. In other instances, the provided input may cause client device 102 to identify and execute an application program associated with the financial institution (e.g., a mobile application established and maintained by issuer system 160), which generates a graphical user interface for presentation to user 101 on display unit 112A. The disclosed embodiments are, however, not limited to these examples of web- and application-based interfaces, and in other instances, user 101 may provide input to client device 102 requesting access to any additional or alternate digital portal associated with issuer system 160 and/or the financial institution, such as an interface generated by a digital wallet application executed by client device 102.

Figure 6A:
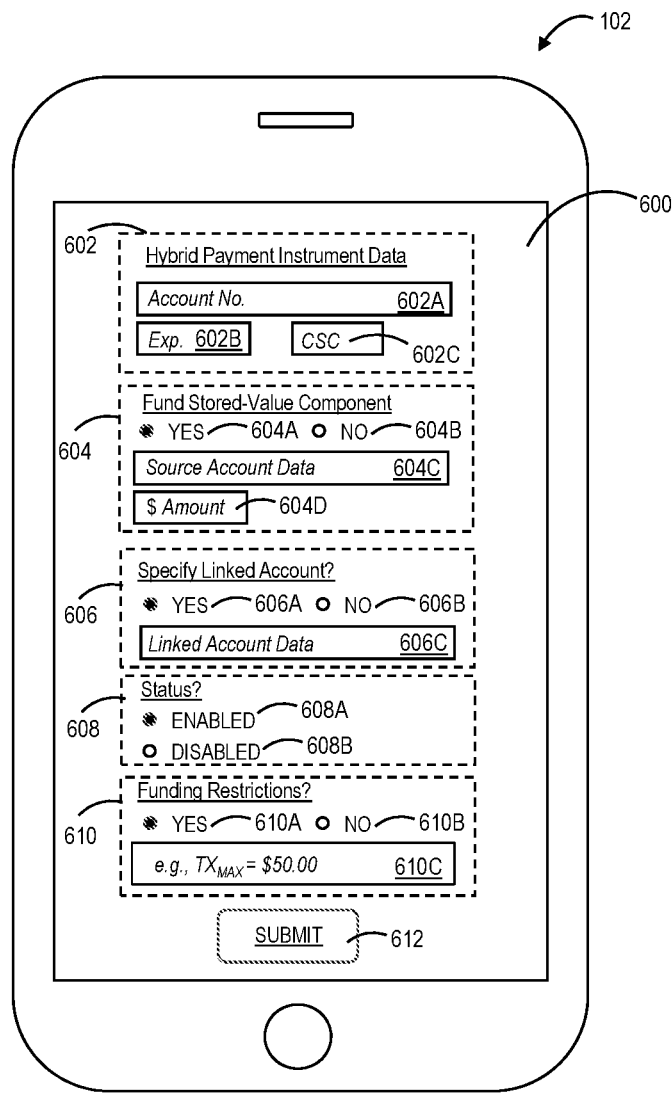
FIG. 6A is a diagram of an exemplary graphical user interface, in accordance with the disclosed embodiments.

The graphical user interface (GUI) generated by the accessed web page or the executed application may, in certain aspects, facilitate a selective configuration of an operation of the stored-value (SV) and linked-account (LA) components of the hybrid payment instrument. For example, as illustrated in FIG. 6A, client device 102 may generate and present (e.g., on display unit 112A) a GUI 600 that includes interface elements facilitating an identification of the hybrid payment instrument (e.g., interface elements 602); an initial or subsequent transfer of funds to the SV account of the hybrid payment instrument (e.g., interface elements 604); a linkage between the hybrid payment instrument and a financial services account issued by the financial institution, such as a debit or credit card account (e.g., interface elements 606); a configuration of a status of the linked financial services account (e.g., interface elements 608); and a specification of various restrictions on the ability of the SV account to funds portions of purchase transactions involving the hybrid payment instrument (e.g., interface elements 610). The disclosed embodiments are not limited to these examples of interface elements and configuration activities, and in further aspects, GUI 600 may include interface elements directed to any additional or alternate configuration appropriate to the hybrid payment instrument, the SV and LA accounts, and issuer system 160.

For example, in FIG. 6A, user 101 may provide input to client device (e.g., via input unit 112B) that identifies the account number, expiration date, and card-security code (CSC) of the hybrid payment instrument issued by the financial institution (e.g., as presented within interface elements 602A, 602B, and 602C, respectively). In other aspects, client device 102 may store account data that characterizes the hybrid payment instrument, and additionally or alternatively, may receive portions of the account data from issuer system 160, and client device 102 may perform operations that populate interface elements 602A, 602B, and/or 602C with portions of the account information.

Further, if user 101 elects to transfer additional funds to the SV account associated with the hybrid payment instrument, user 101 may provide input to client device 102 (e.g., via input unit 112B) that selects interface element 604A (e.g., associated with "YES"), and may provide additional input to client device that identifies a source account for the transfer (e.g., within interface element 604C) and an amount of the transfer (e.g., interface element 604D). In some aspects, the source account may include a financial services account, such as a credit card account, debit card account, checking or savings account, or other financial services account held by user 101, and the source account may be issued by the financial institution that operates issuer system 160, or alternatively, one or more additional financial institutions that issue accounts held by user 101. In other instances, if user 101 were to elect not to fund the SV account associated with the hybrid payment instrument, user 101 may provide input to client device 102 (e.g., via input unit 112B) that selects interface element 604B (e.g., associated with "NO").

Additionally, and as illustrated in FIG. 6A, user 101 may provide input to client device 102 (e.g., via input unit 112B) that specifies an intention to link a financial services account to the hybrid payment instrument. For example, by providing input to client device 102 that selects interface element 606A (e.g., "YES"), user 101 may indicate an intention to link the financial services account to the hybrid payment instrument, and may provide, as additional input, account data that characterizes the linked financial services account, such as, but not limited to, an account number, an expiration date, a CSC, or a routing number (e.g., within interface element 606C. As described herein, the linked account may be issued by the financial institution that issued the hybrid payment instrument, and may include, but is not limited to, a credit card account, a debit card account, or a demand deposit account, such as a checking account. In other instances, user 101 may indicate an intention not to link any financial services account to the hybrid payment instrument (e.g., to fund any initiated transaction based solely on a current balance of funds allocated to the SV account) by providing input to client device that selects interface element 606B, e.g., "NO."

Further, when user 101 linked the financial services account to the hybrid payment instrument, user 101 may provide additional input to client device 102 (e.g., via input unit 102) that establishes a status of that linked financial services account. For example, if user intends to funds portions of initiated transactions using the linked financial services account, user 101 may provide input to client device 102 that selects interface element 608A, which corresponds to a linked account status of "enabled," as described above. Alternatively, user 101 may provide additional input to client device 102 that selects interface element 608B, which corresponds to a linked account status of "disabled," and indicates that the linked financial services account is unavailable to fund portions of initiated transactions involving the hybrid payment instrument.

Finally, user 101 may provide input to client device that specifies one or more restrictions on an operation of the stored-value of linked-account components of the hybrid payment instrument (e.g., the restrictions described above). For example, if user 101 intends to specify the one or more funding restriction, user 101 may provide input to client device 102 (e.g., via input unit 112A) that selects interface element 710A (e.g., corresponding to "YES") and specifies the one or more restrictions within interface element 710C or other menu-based or text-based interface elements (not depicted in FIG. 7A). Alternatively, if user 101 does not intend to restrict an ability of the SV and/or LV components to fund portions of purchase transactions involving the hybrid payment instrument, user 101 may provide input to client device that selects interface element 608B (e.g., which corresponds to "NO").

Upon completion of the configuration process through GUI 600, user 101 may provide further input to client device 102 (e.g., via input unit 112B) that selects interface element 612 (e.g., "SUBMIT"). In some aspects, client device 102 may perform operations that detect the selection of interface element 612, and in response to the detection, package the provided input into a configuration data package, which client device 102 may transmit across network 120B to issuer system 160 using any of the communications protocols described herein. Issuer system 160 may receive the configuration data package, and perform operations that parse the configuration data package to verify an authenticity of the hybrid payment instrument and store portions of the user-specified configuration data within corresponding portions of the one or more tangible, non-transitory memories, as described below in reference to FIG. 6B.

Figure 6B:
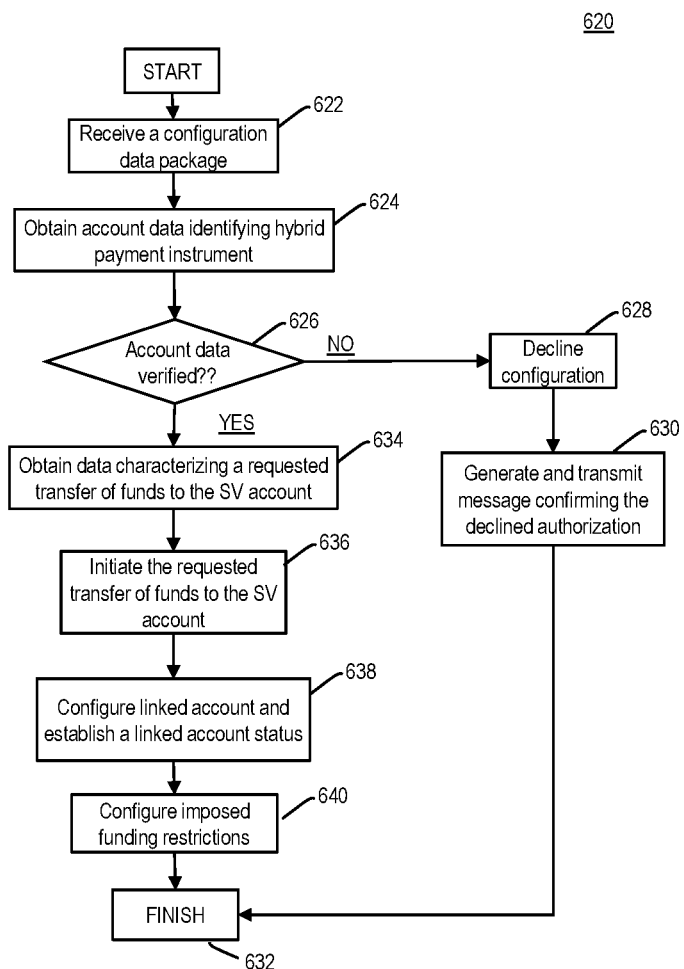
FIG. 6B is a flowchart of an exemplary process for configuring a payment instrument linked to multiple funding accounts, in accordance with the disclosed embodiments.

FIG. 6B is a flowchart of an example process 620 for configuring a hybrid payment instrument based on user-specified configuration data. In some aspects, a computer system associated with a financial institution that issues the hybrid payment instrument, e.g., such as issuer system 160 of FIG. 1, may perform the steps of example process 620. For example, issuer system 160 may extract, from a received configuration data package, account data that characterizes the hybrid payment instrument, and issuer system 160 may perform operations that verify an authenticity of the extracted account data based corresponding account data locally stored within one or more tangible, non-transitory memories. In response to a successful verification, issuer system 160 may perform additional operations that parse and unpackage the configuration data package, and store locally corresponding portions of the unpackaged configuration data within the one or more tangible, non-transitory memories.

For example, issuer system 160 may receive the configuration data package from client device 102 across network 120B (e.g., in step 622), and may parse the received configuration data package to obtain account data characterizing the hybrid payment instrument (e.g., in step 624). For example, the obtained account data may correspond to the account number, expiration data, and CSC of the hybrid payment instrument provided by user 101 as input to client device 102 (e.g., to populate interface elements 602A, 602B, and 602C of GUI 600), and issuer system 160 may access stored account data characterizing the hybrid payment instrument (e.g., within hybrid account data 162A of FIG. 1), and may verify the authenticity of the obtained account data based a comparison between the obtained and accessed account data (e.g., in step 626).

If, for example, issuer system 160 were to determine that the obtained account data fails to match the accessed account data (e.g., step 626; NO), issuer system 160 may decline to configure the hybrid payment instrument based on the received configuration data package (e.g., in step 628), and may generate an error message indicative of the erroneous account data, which issuer system 160 may transmit across network 120B to client device 102 using any of the communications protocols described herein (e.g., in step 630). Exemplary process 620 is the complete in step 632.

Alternatively, if issuer system 160 were to determine that the obtained account data matches the accessed account data (e.g., step 626; YES), issuer system 160 may process the received configuration data package to obtain data identifying a requested transfer of funds from a source account of user 101 to the SV account associated with the hybrid payment instrument (e.g., in step 634). The obtained transfer data may include, but is not limited to, account data that characterizes a source account (e.g., an account number, expiration data, CSC, routing number, etc.) and an amount of the requested transfer, and issuer system 160 may perform operations that initiate and execute the requested transfer of funds, and store data indicative of the updated balance within a portion of SV account data 164 of FIG. 1 (e.g., in step 636).

Further, issuer system 160 may also process the configuration data package to obtain data identifying the linked account associated with the hybrid payment instrument and a status of that linked account (e.g., in step 638). For example, issuer system 160 may extract, as portions of the linked account data, one or more identifiers of the linked account (e.g., an account number, expiration data, CSC, etc., specified within interface element 606C of GUI 600) and data specifying the status of the linked account (e.g., "enabled" or "disabled," as specified by interface elements 608A or 608B of GUI 600). In some aspects, in step 630, issuer system 160 may perform operations that store portions of the extracted LA data within linked account data 168, e.g., as LA status 418 and LA identifier 420 of FIG. 4A. In other aspects, if issuer system 160 were to identify no financial services account linked to the hybrid payment instrument, issuer system 160 may establish a status parameter value of "null" for the hybrid payment instrument, and store data indicative of the null status within LA status 418 and LA identifier 420.

In additional aspects, issuer system 160 may process the configuration data package to obtain data identifying and specifying one or more restrictions imposed by user 101 on an ability of the hybrid payment instrument to fund portions of initiated transactions (e.g., in step 640). For example, and as described above, the obtained funding restriction data may establish a threshold funding amount of $50.00 on the stored-value account associated with the hybrid payment instrument, and require the linked account associated with the hybrid payment instrument fund any portion of an initiated purchased transaction that exceeds the threshold funding amount. The disclosed embodiments are, however, not limited to this exemplary funding restriction and in other aspects, the configuration data package may specify any additional or alternate restriction that would be appropriate to issuer system 160 and/or the stored-value and linked accounts associated with the hybrid payment instrument. Issuer system 160 may, in some instances, store the obtained funding restriction data within corresponding portions of SV configuration data 166, such as data 314 of FIG. 3. Exemplary process 720 is then complete in step 632.

For example, through certain of these exemplary configuration processes, a parent may access a hybrid payment instrument on behalf of a child, and may provide configuration data to GUI 600 (e.g., as described above in FIG. 6A) that links the parent's debit card account to the hybrid payment instrument (e.g., which are both issued by a common financial institution operating issuer system 160) and further, that disables the ability of the linked debit card account to fund purchase transactions involving the hybrid payment instrument. In certain aspects, the parent may initially configure the hybrid payment instrument to function as a stored-value card, which provides the parent with tight control over any spending involving the hybrid payment instrument. Further, certain of the exemplary configuration processes may enable the parent to selectively reconfigure the hybrid payment instrument to enable the funding of purchase transactions by the linked debit card account, either in advance of a particular purchase or as a reward for the child's responsible behavior.

In other aspects, not illustrated in FIGS. 6A and 6B, certain of the disclosed embodiments may enable a customer, e.g., user 101, to provide input to client device 102 (e.g., in response to presented GUI 600) that loads the SV account associated with the hybrid payment instrument with funds denominated in multiple currencies, e.g., the U.S. dollar, the Canadian dollar, and the Euro, and to specify one or more restrictions (e.g., within interface element 610C) that cause issuer system 160 to fund selectively fund purchase transactions in a loaded currency appropriate to a geographic location associated with the purchase transactions.

In further aspects, also not illustrated in FIG. 6A or 6B, certain of the disclosed embodiments may enable a customer, e.g., user 101, to provide input to client device 102 (e.g., in response to presented GUI 600) that loads the SV account associated with the hybrid payment instrument with multiple "buckets" of funds associated with certain transactions contexts, e.g., types of purchased goods or services, specific restaurants, specific temporal or geographic ranges, etc. By selectively enabling or disabling the ability of the linked account to fund purchase associated with certain of these funded "buckets," user 101 may be able to budget a limited monthly or weekly income effectively.

IV. Exemplary Hardware and Software Implementations

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification, including SV authorization module 172, funding API 174, LA authorization module 176, payment module 202, transaction initiation module 210, routing module 214, relay modules 216 and 218, verification module 220, transaction initiation module 302, transaction determination module 306, restriction module 312, authorization module 316, confirmation module 320, transaction confirmation module 324, interface element generation module 328, request module 416, transaction module 424, and authorization module 428, can be implemented as one or more computer programs, i.e., one or more modules of computer program instructions encoded on a tangible non-transitory program carrier for execution by, or to control the operation of, a data processing apparatus (or a computer system). Additionally or alternatively, the program instructions can be encoded on an artificially-generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including by way of example a programmable processor, a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a client computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus, comprising:
   a memory storing instructions;
   a communications module; and
   at least one processor coupled to the communications module and the memory, the at least one processor being configured to execute the instructions to:
      receive, through the communications module, an authorization request from a terminal device, the authorization request comprising a transaction amount that characterizes a transaction initiated at the terminal device and an unencrypted identifier of a first payment instrument associated with a client device involved in the initiated transaction, the client device being in communication with the terminal device across a corresponding communications channel;
      based on the unencrypted identifier of the first payment instrument, obtain account data associated with a second payment instrument comprising a stored value account, and based on the account data, determine a first balance of funds allocated to the stored value account;
      obtain an authorization restriction associated with the second payment instrument, and determine that (i) a first portion of the transaction amount is consistent with the authorization restriction and (ii) that the first balance of funds is at least equivalent to the first portion of the transaction amount;
      request and receive linked account data from a programmatic interface of an application program executed by the at least one processor, the linked account data identifying a second balance of funds allocated to an account linked to the second payment instrument;
      obtain an identifier of the linked account data based on at least the unencrypted identifier of the first payment instrument;
      generate an additional authorization request that includes the identifier of the linked account and a second portion of the transaction amount, and transmit the additional authorization request to a computing system via the communications module, the additional authorization request being transmitted via a programmatic interface, and the computing system performing operations that authorize a funding of the second portion of the transaction amount based on the second balance of funds allocated to the linked account;
      receive, from the computing system via the communications module, decision data indicative of the authorization of the funding of the second portion of the transaction amount; and
      transmit, through the communications module, confirmation data indicative of the authorized transaction to the terminal device.

2. The apparatus of claim 1, wherein the at least one processor is further configured to:
   determine that the first balance of funds exceeds the transaction amount characterizing the initiated transaction; and
   in response to the determination that the first balance of funds exceeds the transaction amount, authorize the initiated transaction in accordance with the transaction amount.

3. The apparatus of claim 1, wherein:
   the first balance of funds corresponds to a zero value;
   the second balance of funds is equivalent to the transaction amount; and
   the at least one processor is further configured to authorize, based on the second balance of funds, the initiated transaction in accordance with the transaction amount.

4. The apparatus of claim 1, wherein the at least one processor is further configured to:
   obtain status data associated with the executed application program, the status data comprising a status parameter, a value of the status parameter being indicative of an availability of the linked account;
   determine the availability of the linked account data based on the status parameter value; and
   request the linked account data from the executed application program in response to the determined availability.

5. The apparatus of claim 1, wherein the at least one processor is further configured to:
   obtain restriction data that specifies the authorization restriction associated with the second payment instrument;
   establish an applicability of the authorization restriction to the initiated transaction; and
   based on the established applicability, determine that the first portion of the transaction amount is consistent with the authorization restriction, and determine that the first balance of funds is at least equivalent to the first portion of the transaction amount.

6. The apparatus of claim 1, wherein:
   the authorization restriction specifies a threshold balance of funds; and
   the at least one processor is further configured to:
      determine that the first balance of funds allocated to the second payment instrument exceeds the threshold balance; and
      establish the threshold balance as the first portion of the transaction amount; and
   the second portion of the transaction amount corresponds to a difference between the transaction amount and the first portion of the transaction amount.

7. The apparatus of claim 1, wherein the client device comprises a wearable device.

8. The apparatus of claim 1, wherein:
   the initiated transaction comprises a purchase transaction initiated at the terminal device;
   the client device transmits payment data identifying the payment instrument to the terminal device in response to the initiated transaction, and the authorization request comprising at least a portion of the payment data;
   a prior load transaction loads the first balance of funds onto the stored value account associated with the second payment instrument;
   the executed application program is associated with the linked account; and the executed application program allocates the second balance of funds to the linked account, the second balance of funds being available to fund purchase transactions involving the linked account.

9. The apparatus of claim 8, wherein:
the linked account comprises a credit card account, a debit card account, or a demand deposit account issued by the apparatus and associated with a user of the client device;
the at least one processor is further configured to:
receive configuration data from the client device, the configuration data identifying the linked account and an availability of the linked account to fund the second portion of the transaction amount, and the configuration data being provided by the user as input to the client device;
in response to the received configuration data, establish an association between the linked account and the second payment instrument; and
generate, and store within the memory, (i) data indicative of the established association between the payment instrument and the linked account and (ii) a value of a status parameter indicative of the availability of the linked account to fund the second portion of the transaction amount.

10. A computer-implemented method comprising:
receiving, by at least one processor, a transaction amount that characterizes a transaction initiated at the terminal device and an identifier of a first payment instrument associated with a client device involved in the initiated transaction, the client device being in communication with the terminal device across a corresponding communications channel;
based on the unencrypted identifier of the first payment instrument, obtaining, by the at least one processor, account data associated with a second payment instrument comprising a stored value account, and based on the account data, determine a first balance of funds allocated to the stored value account;
by the at least one processor, obtaining an authorization restriction associated with the second payment instrument, and determining that (i) a first portion of the transaction amount is consistent with the authorization restriction and (ii) that the first balance of funds is at least equivalent to the first portion of the transaction amount;
by the at least one processor, requesting and receiving linked account data from a programmatic interface of an application program executed by the at least one processor, the linked account data identifying a second balance of funds allocated to an account linked to the second payment instrument;
by the at least one processor, obtaining an identifier of the linked account data based on at least the unencrypted identifier of the first payment instrument;
by the at least one processor, generating an additional authorization request that includes the identifier of the linked account and a second portion of the transaction amount, and transmit the additional authorization request to a computing system via the communications module, the additional authorization request being transmitted via a programmatic interface, and the computing system performing operations that authorize a funding of the second portion of the transaction amount based on the second balance of funds allocated to the linked account;
by the at least one processor, receiving, from the computing system via the communications module, decision data indicative of the authorization of the funding of the second portion of the transaction amount; and
transmitting, by the at least one processor, confirmation data indicative of the authorized transaction to the terminal device.

11. An apparatus, comprising:
a memory storing instructions;
a communications unit; and
at least one processor coupled to the communications unit and the memory, the at least one processor being configured to execute the instructions to:
receive, through the communications unit, an authorization request from a terminal device, the authorization request comprising a transaction amount that characterizes a transaction initiated at the terminal device and an unencrypted identifier of a first payment instrument associated with a client device involved in the initiated transaction, the client device being in communication with the terminal device across a corresponding communications channel;
based on the unencrypted identifier of the first payment instrument, obtain account data associated with a second payment instrument comprising a stored value account, and based on the account data, determine a first balance of funds allocated to the stored value account;
obtain an authorization restriction associated with the second payment instrument, and determine that (i) a first portion of the transaction amount is consistent with the authorization restriction and (ii) that the first balance of funds is at least equivalent to the first portion of the transaction amount;
request and receive, through the communications unit, linked account data from a computing system, the computing system being configured to execute an application that generates the linked account data in response to the request, the request being provided to the executed application through a programmatic interface, and the linked account data identifying a second balance of funds allocated to an account linked to the second payment instrument;
obtain an identifier of the linked account data based on at least the unencrypted identifier of the first payment instrument;
generate an additional authorization request that includes the identifier of the linked account and a second portion of the transaction amount, and transmit the additional authorization request to the computing system via the communications module, the additional authorization request being transmitted via the programmatic interface, and the computing system performing operations that authorize a funding of the second portion of the transaction amount based on the second balance of funds allocated to the linked account;
receive, from the computing system via the communications module, decision data indicative of the authorization of the funding of the second portion of the transaction amount; and
transmit, through the communications unit, confirmation data indicative of the authorized transaction to the terminal device.

12. The apparatus of claim 11, wherein the at least one processor is further configured to:

determine that the first balance of funds exceeds the transaction amount characterizing the initiated transaction; and in response to the determination that the first balance of funds exceeds the transaction amount, authorize the initiated transaction in accordance with the transaction amount.

13. The apparatus of claim 11, wherein:
the first balance of funds corresponds to a zero value;
the second balance of funds is equivalent to the transaction amount; and
the at least one processor is further configured to authorize, based on the second balance of funds, the initiated transaction in accordance with the transaction amount.

14. The apparatus of claim 11, wherein the at least one processor is further configured to:
obtain status data associated with the executed application program, the status data comprising a status parameter, a value of the status parameter being indicative of an availability of the linked account;
determine the availability of the linked account based on the status parameter value; and
request the linked account data from the executed application program in response to the determined availability.

15. The apparatus of claim 11, wherein the at least one processor is further configured to:
obtain restriction data that specifies the authorization restriction associated with the second payment instrument;
establish an applicability of the authorization restriction to the initiated transaction; and
based on the established applicability, determine that the first portion of the transaction amount is consistent with the authorization restriction, and determine that the first balance of funds is at least equivalent to the first portion of the transaction amount.

16. The apparatus of claim 15, wherein:
the authorization restriction specifies a threshold balance of funds; and
the at least one processor is further configured to:
determine that the first balance of funds allocated to the second payment instrument exceeds the threshold balance; and
establish the threshold balance as the first portion of the transaction amount; and
the second portion of the transaction amount corresponds to a difference between the transaction amount and that first portion.

17. The apparatus of claim 11, wherein:
the initiated transaction comprises a purchase transaction initiated at the terminal device;
the client device transmits payment data identifying the payment instrument to the terminal device in response to the initiated transaction, and the authorization request comprising at least a portion of the payment data;
a prior load transaction loads the first balance of funds onto the second payment instrument;

the executed application program is associated with the linked account; and
the executed application program allocates the second balance of funds to the linked account, the second balance of funds being available to fund purchase transactions involving the linked account.

18. The apparatus of claim 17, wherein:
the linked account comprises a credit card account, a debit card account, or a demand deposit account issued by the apparatus and associated with a user of the client device;
the at least one processor is further configured to:
receive configuration data from the client device, the configuration data identifying the linked account and an availability of the linked account to fund the second portion of the transaction amount, and the configuration data being provided by the user as input to the client device;
in response to the received configuration data, establish an association between the linked account and the second payment instrument; and
generate, and store within the memory, (i) data indicative of the established association between the payment instrument and the linked account and (ii) a value of a status parameter indicative of the availability of the linked account to fund the second portion of the transaction amount.

19. The apparatus of claim 1, wherein the at least one processor is further configured to:
compute a difference between the transaction amount and the first portion, and establish the computed difference as the second portion of the transaction amount;
determine, based on the linked account data, that the second balance of funds exceeds the second portion of the transaction amount; and
based on the determination that the second balance of funds exceeds the second portion, authorize the initiated transaction in accordance with the transaction amount.

20. The apparatus of claim 1, wherein the at least one processor is further configured to:
generate the additional authorization request that includes the identifier of the linked account and the second portion of the transaction amount, and provide the additional authorization request to the executed application program via the programmatic interface, the executed application program performing operations that authorize the funding of the second portion of the transaction amount based on the second balance of funds allocated to the linked account;
obtain decision data indicative of the authorization of the funding of the second portion of the transaction amount from the executed application program via the programmatic interface; and
authorize the initiated transaction in accordance with the transaction amount based on the decision data.

* * * * *